(12) United States Patent
Kubota

(10) Patent No.: US 8,411,322 B2
(45) Date of Patent: Apr. 2, 2013

(54) IMAGE PROCESSING APPARATUS, IMAGE FORMING APPARATUS, IMAGE PROCESSING METHOD AND RECORDING MEDIUM ON WHICH IMAGE PROCESSING PROGRAM IS RECORDED

(75) Inventor: Kazuhisa Kubota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 722 days.

(21) Appl. No.: 12/548,179

(22) Filed: Aug. 26, 2009

(65) Prior Publication Data
US 2010/0053697 A1 Mar. 4, 2010

(30) Foreign Application Priority Data

Aug. 27, 2008 (JP) ................ P2008-218857
Dec. 3, 2008 (JP) ................ P2008-309140

(51) Int. Cl.
*G06K 15/00* (2006.01)
*G06K 9/00* (2006.01)
*G06K 9/34* (2006.01)
*H04N 1/40* (2006.01)
*G06T 5/00* (2006.01)

(52) U.S. Cl. ......... 358/2.1; 358/449; 358/1.9; 358/3.03; 358/3.27; 382/165; 382/176

(58) Field of Classification Search .................. 358/2.1, 358/449, 1.9, 3.03, 3.27; 382/165, 176
See application file for complete search history.

(56) References Cited

U.S. PATENT DOCUMENTS

| | | | |
|---|---|---|---|
| 6,064,494 A | 5/2000 | Hirota et al. | |
| 6,417,932 B1 | 7/2002 | Hirota et al. | |
| 6,721,066 B2 | 4/2004 | Hirota et al. | |
| 2008/0239354 A1* | 10/2008 | Usui | 358/1.9 |

FOREIGN PATENT DOCUMENTS

| | | |
|---|---|---|
| JP | 8-186726 A | 7/1996 |
| JP | 9-46512 A | 2/1997 |
| JP | 2000-101832 A | 4/2000 |
| JP | 2000-134469 A | 5/2000 |
| JP | 2000-354167 A | 12/2000 |
| JP | 2002-232708 A | 8/2002 |
| JP | 2003-51946 A | 2/2003 |
| JP | 2003-101691 A | 4/2003 |
| JP | 2003-134309 A | 5/2003 |
| JP | 2005-286571 A | 10/2005 |

* cited by examiner

*Primary Examiner* — Charlotte M Baker
*Assistant Examiner* — Rury Grisham
(74) *Attorney, Agent, or Firm* — Birch, Stewart, Kolasch & Birch, LLP

(57) ABSTRACT

An image processing apparatus that is capable of determining a document size with high accuracy, even when a device for detecting the document size is not placed therein and an input operation of the document size by a user is eliminated is provided. A page background determining section extracts candidates for page backgrounds from input document image data and determines the number of page background types. A white pixel counting section counts the number of white pixels from input document image data. A document size determining section determines the document size of the input document image data, based on the number of page background types determined by the page background determining section, a page background density value which is the lowest density value in one or a plurality of page background areas determined to be page backgrounds, and the number of white pixels extracted by the white pixel counting section.

15 Claims, 14 Drawing Sheets

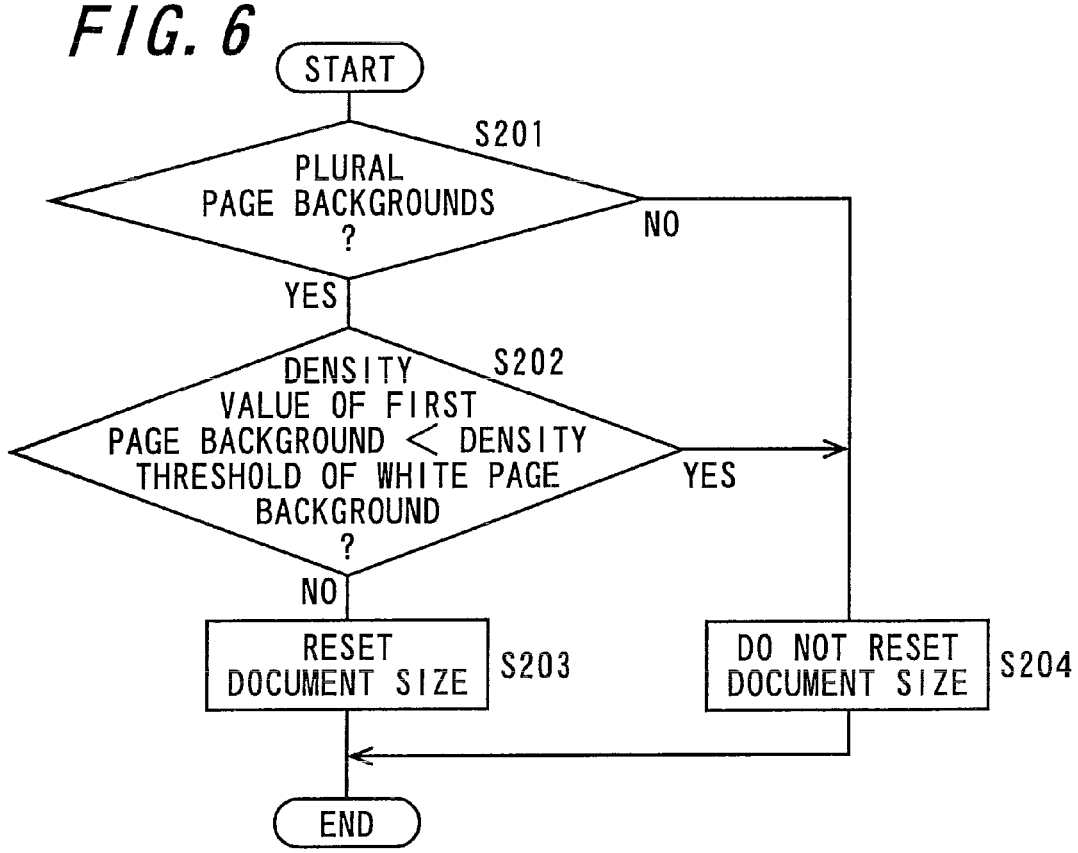

IMAGE PROCESSING APPARATUS, IMAGE FORMING APPARATUS, IMAGE PROCESSING METHOD AND RECORDING MEDIUM ON WHICH IMAGE PROCESSING PROGRAM IS RECORDED

CROSS-REFERENCE TO RELATED APPLICATION

This application claims priority to Japanese Patent Application Nos. 2008-218857 and 2008-309140, which were filed on Aug. 27, 2008 and Dec. 3, 2008, respectively, the contents of which are incorporated herein by reference in their entirety.

BACKGROUND OF THE INVENTION

1. Field of the Invention

The present invention relates to an image processing apparatus that, when a document size is indefinite, perform a discrimination processing on an image area or an image type in the document, and an image forming apparatus, an image processing method and a recording medium on which the image processing program is recorded.

2. Description of the Related Art

In an image forming apparatus such as a copier and multi-function peripheral, and in an image reading apparatus such as a scanner, when a so-called determination of document features, such as a document type determination, a color/monochrome determination and a page background determination, is performed, a threshold used for the determination is normalized by a document size of an input image, and a determination process is performed by using the normalized threshold.

For example, in an image processing apparatus described in Japanese Unexamined Patent Publication JP-A 8-186726 (1996), the document size is detected and, in an AE process, a histogram of monochrome pixels is generated based on the detected document size. A page background level is detected by analyzing the generated histogram.

In an image forming apparatus described in Japanese Unexamined Patent Publication JP-A 9-46512 (1997), the document size is detected, a density histogram of an input image data is generated and a black run length of the input image data is calculated. Based on the generated histogram and the calculated black run length, the discrimination of the document type and the detection of the page background level are performed.

In the case of setting a threshold to be used for the determination process based on the document size, it is necessary to determine the document size by placing a device for detecting the document size or for a user to manually input the document size.

For example, in apparatuses without the device for detecting the document size, the user needs to recognize the document size and perform input operation, but the user needs to have a knowledge of the document size and perform the input operation.

On the other hand, when the user is not prompted to input the document size, the discrimination process is performed by setting an object area in which the discrimination of the document features is performed.

FIG. 12 is a view showing an example of the discrimination object area which has been set. When a smaller area compared to a maximum document size readable by the image forming apparatus is set as a discrimination object area 101, since the document features are discriminated based on a part of the area of the document, it is possible to determine the page background with relatively high accuracy, but the accuracy of color/monochrome determination and the document type determination decreases.

FIG. 13 is a view showing an example of the discrimination object area which has been set. When reading is performed including an area outside of the document size and the area read is set as a determination object area 102, since information of an entire document can be read, the document type determination and the color/monochrome determination are possible. However, the page background determination lacks accuracy since a pressing plate of a document cover is included within the discrimination object area and information of this pressing plate is inputted. To deal with this problem, it is possible to color the pressing plate black or the like, but in this case the image data which has been read may suffer offset.

SUMMARY OF THE INVENTION

An object of the invention is to provide an image processing apparatus that is capable of determining a document size with high accuracy even when a device for detecting the document size is not placed therein and the input operation of the document size by a user is eliminated, and an image forming apparatus, an image processing method and a recording medium on which the image processing program is recorded.

The invention provides an image processing apparatus comprising:

a page background determining section to which document image data corresponding to a document image of a document having been read is inputted and which extracts candidates for page background pixels from the input document image data and determines a number of page background types;

a white pixel extracting section which extracts white pixels from the input document image data; and a document size determining section which determines a document size of the input document image data, based on the number of page backgrounds types determined by the page background determining section, a page background density value which is the lowest density value in one or a plurality of page background areas determined to be page backgrounds, and a number of white pixels extracted by the white pixel extracting section.

According to the invention, the page background determining section extracts the candidates for the page background pixels from the input document image data and determines the number of the page background types, and the white pixel extracting section extracts the white pixels from the input document image data. The document size determining section determines the document size of the input document image data, based on the number of page backgrounds types determined by the page background determining section, the page background density value which is the lowest density value in one or a plurality of page background areas determined to be page backgrounds, and the number of white pixels extracted by the white pixel extracting section.

Thereby, even in the case where a device for detecting a document size is not placed, the input operation of the document size by a user can be eliminated, and the document size can be determined with high accuracy. In addition, it is possible to reduce a circuit size necessary for an image processing.

In addition, in the invention, it is preferable that, when the page background determining section determines that a plurality of page background types exists, the page background density value is compared with a predetermined white page background density threshold, and the document size determining section redetermines the document size when the page background density value is greater than the white page background threshold.

According to the invention, when the page background determining section determines that a plurality of page background types exists, the page background density value is compared with a predetermined white page background density threshold, and the document size determining section redetermines the document size when the page background density value is greater than the predetermined white page background threshold.

Thereby, even in the case where information of an area outside of the document size, such as information of a pressing plate of a document cover, is included, it is possible to determine whether or not the information of the area outside of the document size can be dealt with as a part of the page background. When the information of the area outside of the document size cannot be dealt with as a part of the page background, it is possible to determine the document size with high accuracy.

Furthermore, in the invention, it is preferable that the document size determining section calculates difference values between a number of pixels in a maximum readable document size and numbers of pixels in document sizes that are smaller than the maximum readable document size, sequentially compares the calculated difference values with the number of white pixels that is extracted by the white pixel extracting section, determines a range of the difference values that the number of white pixels satisfies, and, in accordance with the determined range of the difference values, determines the document size to be the maximum readable document size, a document size that is a size other than the maximum readable document size and a larger document size corresponding to the range of the difference values which the number of white pixels satisfy, or a minimum document size.

According to the invention, the document size determining section calculates difference values between the number of pixels in a maximum readable document size and the numbers of pixels in document sizes that are smaller than the maximum readable document size, by sequentially compares the calculated difference values with the number of white pixels that is extracted by the white pixel extracting section, and determines the range of the difference values that the number of white pixels satisfies. In accordance with the determined range of the difference values, the document size determining section determines the document size to be the maximum readable document size, a document size that is a size other than the maximum readable document size and a larger document size corresponding to the range of the difference values which the number of white pixels satisfy, or a minimum document size.

Thereby, the document size can be determined through a simple process with high accuracy, by sequentially comparing the difference values arising from the difference in the document size with the number of white pixels.

Furthermore, in the invention, it is preferable that the image processing apparatus is configured so as to be capable of inputting document image data from a document reading apparatus which reads document image data of a document to be conveyed, when the document image data is inputted from the document reading apparatus, the document size determining section redetermines the document size by estimating a first document size based on a size in a conveyance direction of the document image data which has been read, and, when a plurality of first document sizes are estimated, setting difference values between the respective total numbers of pixels in the plurality of the estimated document sizes to thresholds, comparing the number of white pixels with the thresholds, and thereby determining a second document size.

According to the invention, when document image data read from a document to be conveyed is inputted, the document size determining section redetermines the document size by estimating a first document size based on a size in a conveyance direction of the document image data which has been read, and when a plurality of first document sizes are estimated, setting difference values between the respective total numbers of pixels in the plurality of the estimated document sizes to thresholds, comparing the number of white pixels with the thresholds, and thereby determining a second document size.

Thereby, even in the case where a device for detecting a document size is not placed and a conveying document has been read, the document size can be determined through a simple process with high accuracy.

Furthermore, in the invention, it is preferable that the image processing apparatus further comprises a removal pixel-number determining section for determining a number of pixels to be removed from candidates for page background pixels based on the redetermined document size, and the page background determining section redetermines a page background using a number of pixels in which the number of removal pixels are removed from the number of white pixels.

According to the invention, a removal pixel-number determining section determines the number of pixels to be removed from candidates for page background pixels based on the redetermined document size, and the page background determining section redetermines a page background using a number of pixels in which the number of removal pixels is removed from the number of white pixels.

Thereby, the page background can be determined without being influenced by information of the area outside of the document size.

In addition, in the invention, it is preferable that the image processing apparatus further comprises a document type determining section which determines a document type based on the redetermined document size.

According to the invention, since the document type determining section determines a document type based on the redetermined document size, the document type determining section can determine the document type without being influenced by information of the area outside of the document size.

Furthermore, in the invention, it is preferable that the image processing apparatus further comprises a color document determining section which performs the determination whether a document is a color document or a monochrome document based on the redetermined document size.

According to the invention, since the color document determining section determines whether a document is a color document or a monochrome document based on the redetermined document size, the color document determining section can determine the color document without being influenced by information of the area outside of the document size.

Furthermore, the invention provides an image forming apparatus comprising the image processing apparatus mentioned above.

According to the invention, an image forming apparatus comprises the image processing apparatus mentioned above.

Thereby, the image forming apparatus can be provided, such that, even in the case where a device for detecting a document size is not placed, the input operation of the document size by a user can be eliminated and the document size can be determined with high accuracy.

Furthermore, the invention provides an image processing method comprising:

a step of inputting document image data corresponding to a document image of a document having been read, extracting candidates for page background pixels from the input document image data and determines a number of page background types;

a step of extracting white pixels from the input document image data; and a step of determining a document size of the input document image data, based on the number of page backgrounds types determined, a page background density value which is the lowest density value in one or a plurality of page background areas determined to be page backgrounds, and a number of white pixels extracted.

According to the invention, candidates for page background pixels are extracted from the input document image data, the number of the page background types is determined, and white pixels are extracted from the input document image data. A document size of the input document image data is determined, based on the number of page backgrounds types determined, a page background density value which is the lowest density value in one or a plurality of page background areas determined to be page backgrounds, and the number of white pixels extracted.

Thereby, even in the case where a section for detecting document size is not placed, the input operation of the document size by a user can be eliminated, and the document size can be determined with high accuracy. In addition, it is possible to reduce a circuit size necessary for an image processing.

Furthermore, the invention may provide a computer-readable recording medium on which an image processing program for making a computer operate as the image processing apparatus mentioned above is recorded.

According to the invention, it is possible to provide a computer-readable recording medium on which an image processing program for making a computer operate as the image processing apparatus mentioned above.

BRIEF DESCRIPTION OF THE DRAWINGS

Other and further objects, features, and advantages of the invention will be more explicit from the following detailed description taken with reference to the drawings wherein:

FIG. 6 is a flowchart showing a document size determination process;

DETAILED DESCRIPTION

Figure 1:
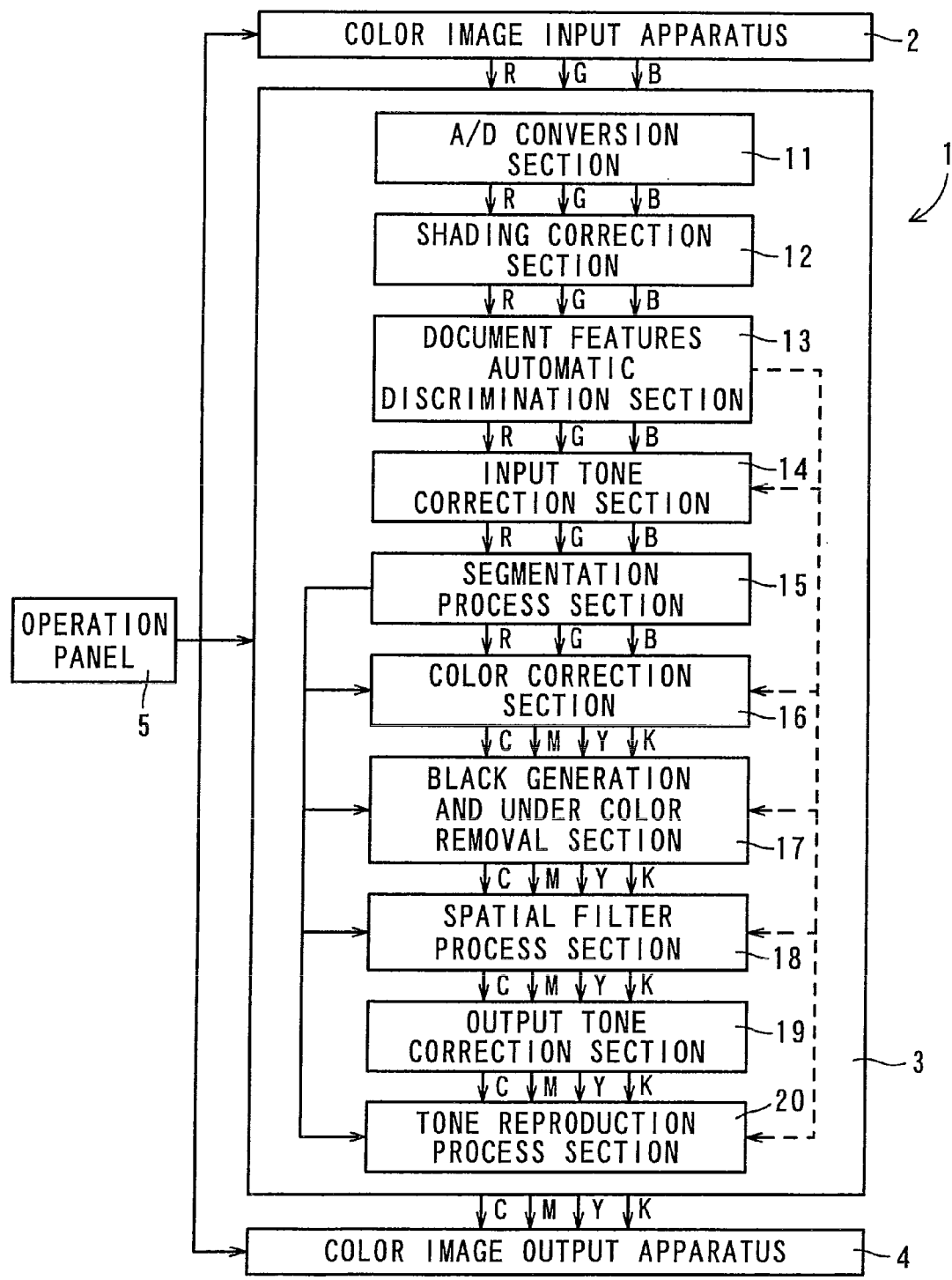
FIG. 1 is a block diagram showing a configuration of an image forming apparatus according to one embodiment of the invention.

Now referring to the drawings, preferred embodiments of the invention are described below.

FIG. 1 is a block diagram showing a configuration of an image forming apparatus 1 according to one embodiment of the invention. In the present embodiment, the image forming apparatus 1 is applied to an electrophotographic digital color copier.

The image forming apparatus 1 includes a color image input apparatus 2, a color image processing apparatus 3, a color image output apparatus 4, and an operation panel 5. The color image processing apparatus 3 includes an A/D (analogue/digital) conversion section 11, a shading correction section 12, a document features automatic discrimination section 13, an input tone correction section 14, a segmentation process section 15, a color correction section 16, a black generation and under color removal section 17, a spatial filter process section 18, an output tone correction section 19, and a tone reproduction process section 20.

The color image input apparatus 2 which is an image reading section includes, for example, a scanner section (not shown) including a CCD (Charge Coupled Device) image sensor. The color image input apparatus 2 reads a reflected light image from a document by the CCD image sensor as image data composed of analogue signals respectively corresponding to RGB (R: Red, G: Green, and B: Blue) and representing the reflectivity of reflected light from a recording sheet such as paper on which a document image is recorded, and inputs the image data to the color image processing apparatus 3.

The image data read by the color image input apparatus 2 is transmitted to the A/D conversion section 11, the shading correction section 12, the document features automatic discrimination section 13, the input tone correction section 14, the segmentation process section 15, the color correction section 16, the black generation and under color removal section 17, the spatial filter process section 18, the output tone correction section 19, and the tone reproduction process section 20 which are included in the color image processing apparatus 3, in this order and outputted to the color image output apparatus 4 as image data represented by digital color signals respectively corresponding to CMYK (C: Cyan, M: Magenta, Y: Yellow, and K: Black).

The A/D (analogue/digital) conversion section 11 converts the image data of analogue signals respectively corresponding to RGB into image data of digital signals. The shading correction section 12 performs a process of removing various distortions occurring in a lighting system, an image focusing system, and an image sensing system of the color image input apparatus 2, on the image data of digital signals respectively corresponding to RGB, which is sent from the A/D conversion section 11. Also, the shading correction section 12 makes a color balance adjustment.

The document features automatic discrimination section 13 converts the RGB signals (RGB reflectivity signals) from which various distortions have been removed and on which a color balance adjustment has been made by the shading correction section 12, into signals, such as density signals, which are easy for the color image processing apparatus 3 to process, and estimates a document size; then based on the estimated document size, discriminates whether or not the document is to be made a color copy (color determination), whether the document is a text document or a printed-picture document or a text and printed-picture document including both text and a printed-picture (document type determination), and whether or not the document is a document where a page background removal process is to be applied (page background determination).

A color determining signal, a document type determining signal and a page background determining section generated by the document features automatic discrimination section 13 are outputted to the input tone correction section 14, the color correction section 16, the black generation and under color removal section 17, the spatial filter process section 18, and the tone reproduction process section 20. Note that a detail of the document features automatic discrimination section 13 will be described later.

The input tone correction section 14 performs a process of removing page background density and an image quality adjustment process such as contrast. The color of the page background (a sheet on which text, etc., are printed) of a document varies. For example, the page background color of a yellowish one, such as coarse paper, needs to be treated as white; otherwise, when outputting an image, extra recording agent is also used for a blank portion (page background portion). Therefore, by the input tone correction section 14, page background density is removed, i.e., the density of the page background is brought to the density of a white color, and at the same time, contrast is adjusted. The input tone correction section 14 provides image data composed of density signals respectively corresponding to RGB, to the segmentation process section 15.

The segmentation process section 15 determines to which one of a page background area, a photograph (continuous tone) area like a silver halide photography, a text area, and a halftone area respective pixels in the image data to be inputted, by the density signals respectively corresponding to RGB, belong, and determine whether they are color or monochrome. In the present embodiment, the segmentation indicates that a pixel in the data of one image is separated into either one of a text area, a photograph area (continuous tone area), a page background area or a halftone area, and color or monochrome. The text area represents characters including text and symbols. The page background area represents a background portion of a document. The segmentation process section 15 outputs, based on segmentation results, a segmentation class signal indicating to which area respective pixels belong, to the color correction section 16, the black generation and under color removal section 17, the spatial filter process section 18, and the tone reproduction process section 20, and outputs to the subsequent color correction section 16 the density signals, without any modification, which respectively correspond to RGB and which are outputted from the input tone correction section 14.

The color correction section 16 converts the density signals (input signals) respectively corresponding to RGB provided from the segmentation process section 15, into density signals (hereinafter, referred to as CMY signals) respectively corresponding to CMY, according to the segmentation class signal provided from the segmentation process section 15. The conversion of the density signals respectively corresponding to RGB into signals respectively corresponding to CMY is performed by the color correction section 16. In order to implement faithful color reproduction, the color correction section 16 performs a process of removing color impurity based on the spectral characteristics of CMY color materials containing unnecessary absorption components. The color correction section 16 also performs color conversion based on the document features determining signal provided from the document features automatic discrimination section 13.

The black generation and under color removal section 17 performs a black generation process in which a black signal corresponding to black (K) is generated from the CMY signals corresponding to CMY which have been subjected to color correction by the color correction section 16, and a process of generating new CMY signals by subtracting the K signal obtained through the black generation from the original CMY signals. With these processes, the CMY signals are converted into signals of four colors, CMYK (hereinafter, referred to as CMYK signals).

The black generation and under color removal section 17 performs, as an example of the black generation process, black generation by skeleton black. In the black generation by skeleton black, when the input-output characteristics of a skeleton curve is y=f(x), densities respectively corresponding to C, M, and Y to be inputted are respectively C, M, and Y, densities respectively corresponding to C, M, Y, and K to be outputted are respectively C', M', Y', and K', and the UCR (Under Color Removal) rate is α(0<α<1), in a black generation and under color removal process, by the following equation (1), density signals of three colors, CMY, are converted into density signals of four colors, CMYK.

$$\begin{cases} K' = f\{\min(C, M, Y,)\} \\ C' = C - \alpha K' \\ M' = M - \alpha K' \\ Y' = Y - \alpha K' \end{cases} \quad (1)$$

The spatial filter process section 18 performs a spatial filter process using a digital filter which is set in advance for respective areas, on the image data of CMYK signals provided from the black generation and under color removal section 17, according to the segmentation class signal provided from the segmentation process section 15, to correct spatial frequency characteristics, whereby a blur of an output image and deterioration of graininess are prevented. The output tone correction section 19 performs an output tone correction process based on output properties of the color image output apparatus 4.

As with the spatial filter process section 18, the tone reproduction process section 20 performs a predetermined process on the image data of CMYK signals provided from the output tone correction section 19, according to the segmentation class signal provided from the segmentation process section 15. For example, for an area segmented into the text area by the segmentation process section 15, in order particularly to improve the reproducibility of achromatic text or chromatic text, the amount of high-frequency component is emphasized by an edge enhancement process performed by the spatial filter process section 18, and the tone reproduction process section 20 performs a binarization or multi-level dithering process for a high-resolution screen suitable for reproducing high-frequency component. For an area segmented into the halftone area by the segmentation process section 15, the spatial filter process section 18 performs a low-pass filtering process to remove input halftone components, and then the tone reproduction process section 20 performs a tone reproduction process (halftone generation) in which an image is separated into pixels such that their respective tones can be reproduced. For an area segmented into the photograph area by the segmentation process section 15, a binarization or multi-level dithering process on a screen suitable for tone reproduction is performed.

The operation panel 5 includes, for example, a display section, such as a liquid crystal display, and operation keys. Information to be inputted from the operation panel 5 is provided to a control section (not shown). The control section controls the operations of the color image input apparatus 2, the color image processing apparatus 3, and the color image output apparatus 4, according to the information inputted from the operation panel 5.

Image data to be outputted from the tone reproduction process section 20, i.e., image data having been subjected to the foregoing processes, is temporarily stored in a storage section, read out at predetermined timing, and inputted to the color image output apparatus 4.

The color image output apparatus 4 is an image forming section and outputs the image data as an image to a recording sheet (e.g., a sheet material such as paper). The color image output apparatus 4 is capable of forming an image on a recording sheet using recording agents of two or more colors. In the present embodiment, the color image output apparatus 4 can form an image on a recording sheet using recording agents of C, M, Y, and K colors. The color image output apparatus 4 forms an image using a recording agent of C for image data corresponding to C, forms an image using a recording agent of M for image data corresponding to M, forms an image using a recording agent of Y for image data corresponding to Y, and forms an image using a recording agent of K for image data corresponding to K. Although in the present embodiment the color image output apparatus 4 is implemented by an electrophotographic printing apparatus, in another embodiment of the invention, the color image output apparatus 4 may be implemented by an inkjet printing apparatus. The respective sections of the color image processing apparatus 3 are controlled by a control section (not shown). The control section includes a CPU (Central Processing Unit) and a storage medium storing a control program which is executed and processed by the CPU. When the CPU executes the control program, the color image input apparatus 2, the color image processing apparatus 3, and the color image output apparatus 4 are controlled.

In the embodiment, a device for detecting a document size is not provided. Further, when a user does not input a document size, the color image input apparatus 2 reads a maximum readable area. Hereinafter, this area is referred to as a maximum readable size.

Figure 2:
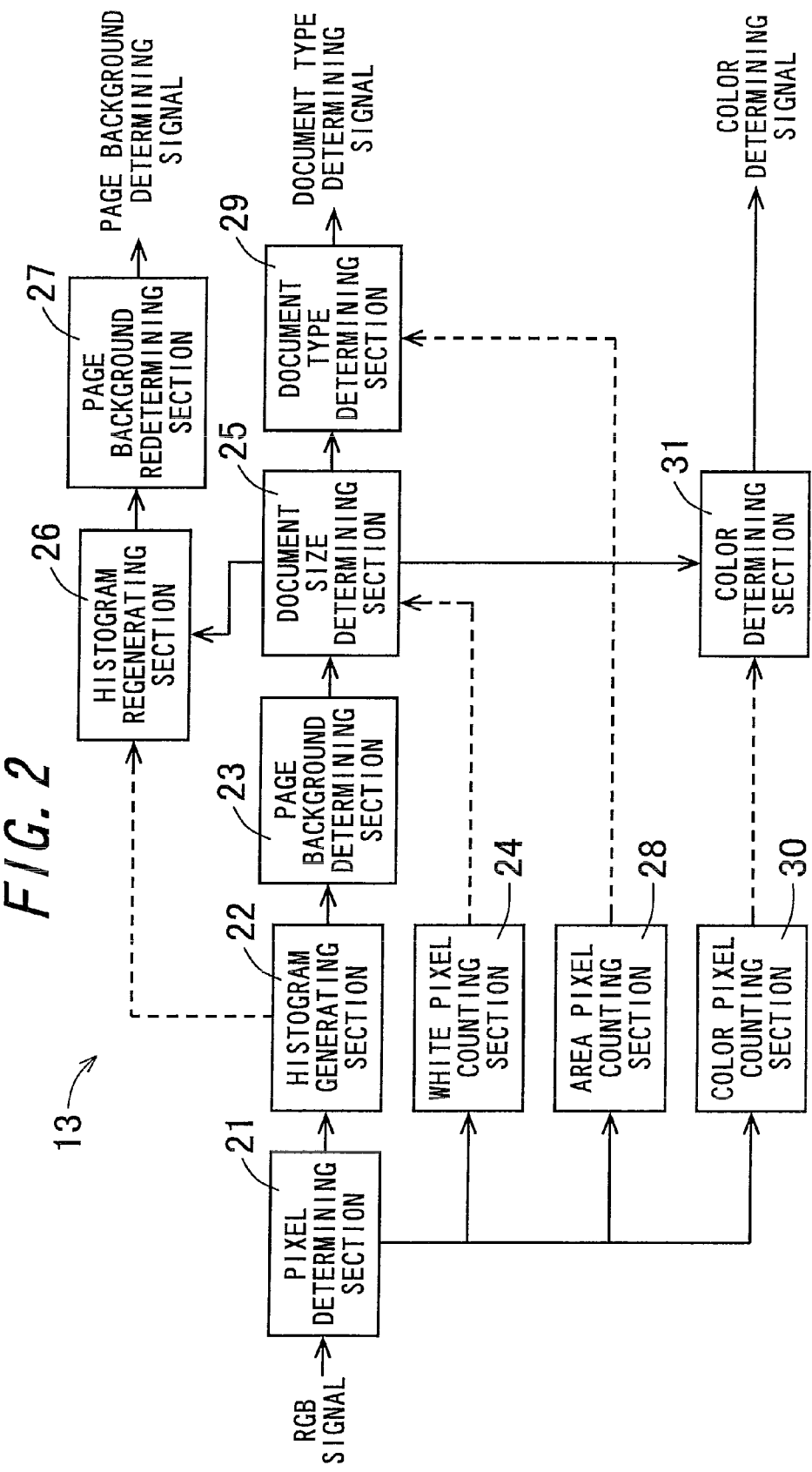
FIG. 2 is a block diagram showing a configuration of a document features automatic discrimination section.
Figure 3:
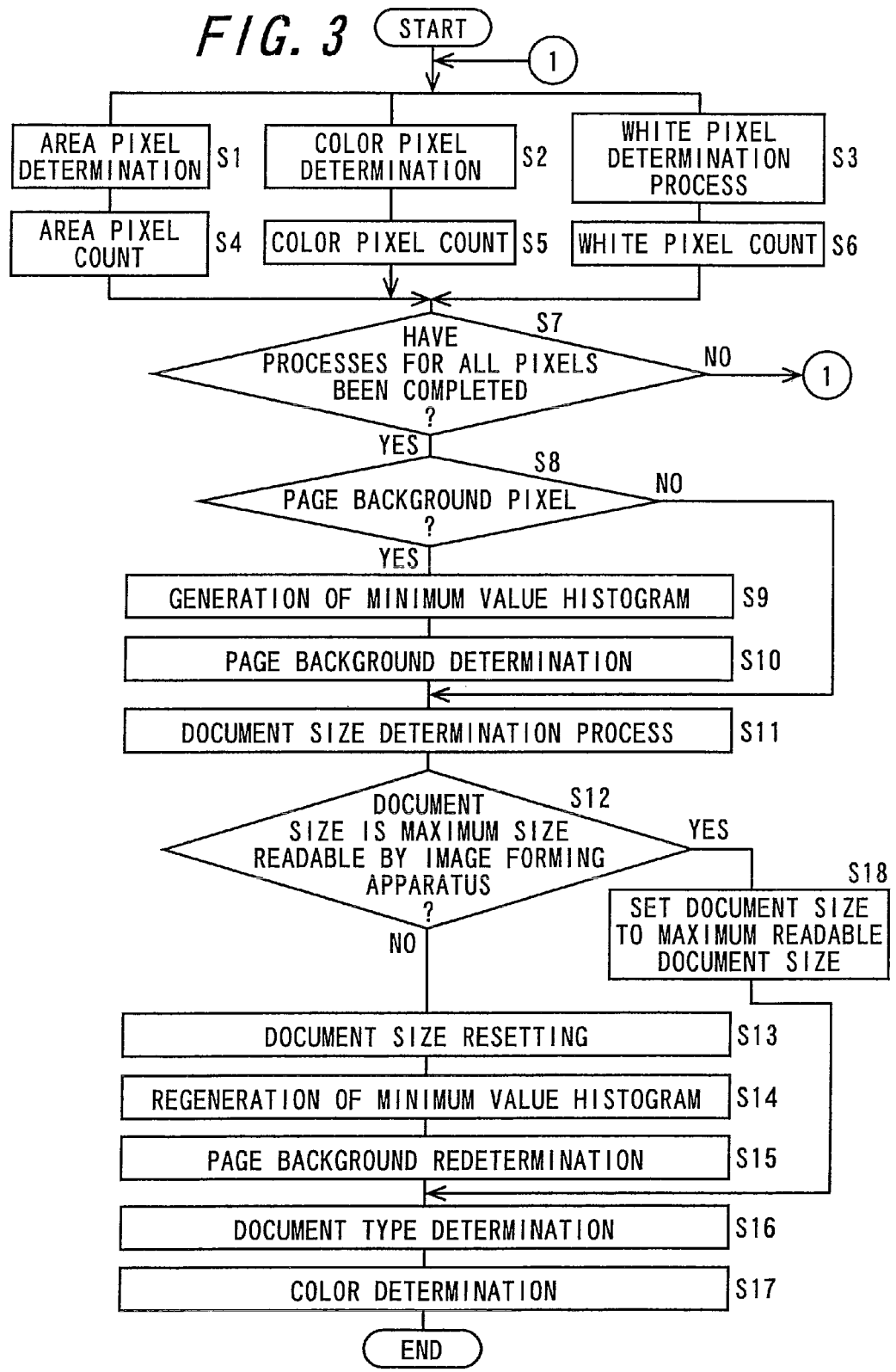
FIG. 3 is a flowchart showing a discrimination process performed by the document features automatic discrimination section.

FIG. 2 is a block diagram showing a configuration of the document features automatic discrimination section 13. FIG. 3 is a flowchart showing a determination process performed by the document features automatic discrimination section 13.

As shown in FIG. 2, the document features automatic discrimination section 13 includes a pixel determining section 21, a histogram generating section 22, a page background determining section 23, a white pixel counting section 24, a document size determining section 25, a histogram regenerating section 26, a page background redetermining section 27, an area pixel counting section 28, a document type determining section 29, a color pixel counting section 30, and a color determining section (a color document determining section) 31.

The pixel determining section 21 performs a discrimination of respective pixels, on an image data of the maximum readable size, by an area pixel determination in step S1. The discrimination of respective pixels is made by segmenting the image data into any of a page background pixel, a photograph pixel, a text pixel, or a halftone pixel. Hereinafter, the page background pixel, the photograph pixel, the text pixel, and the halftone pixel are referred to as area pixels.

An existing segmentation method is applicable to an algorithm for segmenting an image data into area pixels. For example, the following method disclosed in Japanese Unexamined Patent Publication JP-A 2002-232708 is applicable.

(1) A minimum density value and a maximum density value in n-by-m pixels block (e.g., 7×15 pixels) including a pixel of interest are calculated.

(2) A maximum density difference is calculated using the calculated minimum density value and maximum density value.

(3) A total density busyness which is the sum total of absolute values of density differences between pixels adjacent to the pixel of interest (e.g., a sum of values calculated for a main scanning direction and a sub-scanning direction) is calculated.

(4) The calculated maximum density difference is compared with a maximum density difference threshold, and the total density busyness is compared with a total density busyness threshold.

(5) When the maximum density difference is less than the maximum density difference threshold and the total density busyness is less than the total density busyness threshold, it is determined that the pixel of interest belongs to a page-background/photograph area.

(6) When the above conditions are not satisfied, it is determined that the pixel of interest belongs to a text/halftone area.

(7) As to the pixel determined to belong to the page-background/photograph area, when the pixel of interest satisfies a condition where the maximum density difference is less than a page-background/photograph area determination threshold, it is determined that the pixel is a page background pixel, and when the condition is not satisfied, it is determined that the pixel is a photograph pixel.

(8) As to the pixel determined to belong to the text/halftone area, when the pixel of interest satisfies the condition where the total density busyness is less than a product of the maximum density difference and a text/halftone area determination threshold, it is determined that the pixel is a text pixel, and when the condition is not satisfied, it is determined that the pixel is a halftone pixel.

The pixel determining section 21 performs a color pixel determination, on the image data of the maximum readable size, by the color pixel determination in step S2.

An existing color determination method (a chromatic/achromatic determination method) is applicable to an algorithm for determining a color. For example, a method disclosed in Japanese Unexamined Patent Publication JP-A 2005-286571 is applicable as shown below. In the following explanation an example of a process using RGB signals is explained, however, the determination process can be carried out by using CMY signals which are complementary color signals of RGB signals and CIE1976 $L^*a^*b^*$ signals converted from RGB signals (CIE: Commission International de l'Eclairage, $L^*$: Lightness, $a^*$, $b^*$: Chrominance). When the complementary color transformed CMY signals or CIE1976 $L^*a^*b^*$ signals are used, a signal conversion process is performed. Then, based on a result of the color determination, a switching to either a color copying process or a monochrome copying process is performed.

(1) With respect to the RGB signals, in the n-by-m pixels block (e.g., 3×3 pixels) centering on the pixel of interest, average values are calculated for respective input signals and a maximum density difference value is obtained from maximum and minimum values of the calculated average values of respective signals.

(2) The calculated maximum density difference is compared with a predetermined chromatic pixel determination threshold (e.g., 10). When the maximum density difference value is greater than the chromatic pixel determination threshold, it is determined that the pixel of interest is a chromatic pixel. When the maximum density difference value is less than the chromatic pixel determination threshold, it is determined that the pixel of interest is an achromatic pixel.

Furthermore, the pixel determining section 21 performs a determination of a white pixel used for a document size determination, on the image data of the maximum readable size, by the white pixel determination in step S3. In other words, the pixel determining section 21 serves as a white pixel extracting section.

Figure 4:
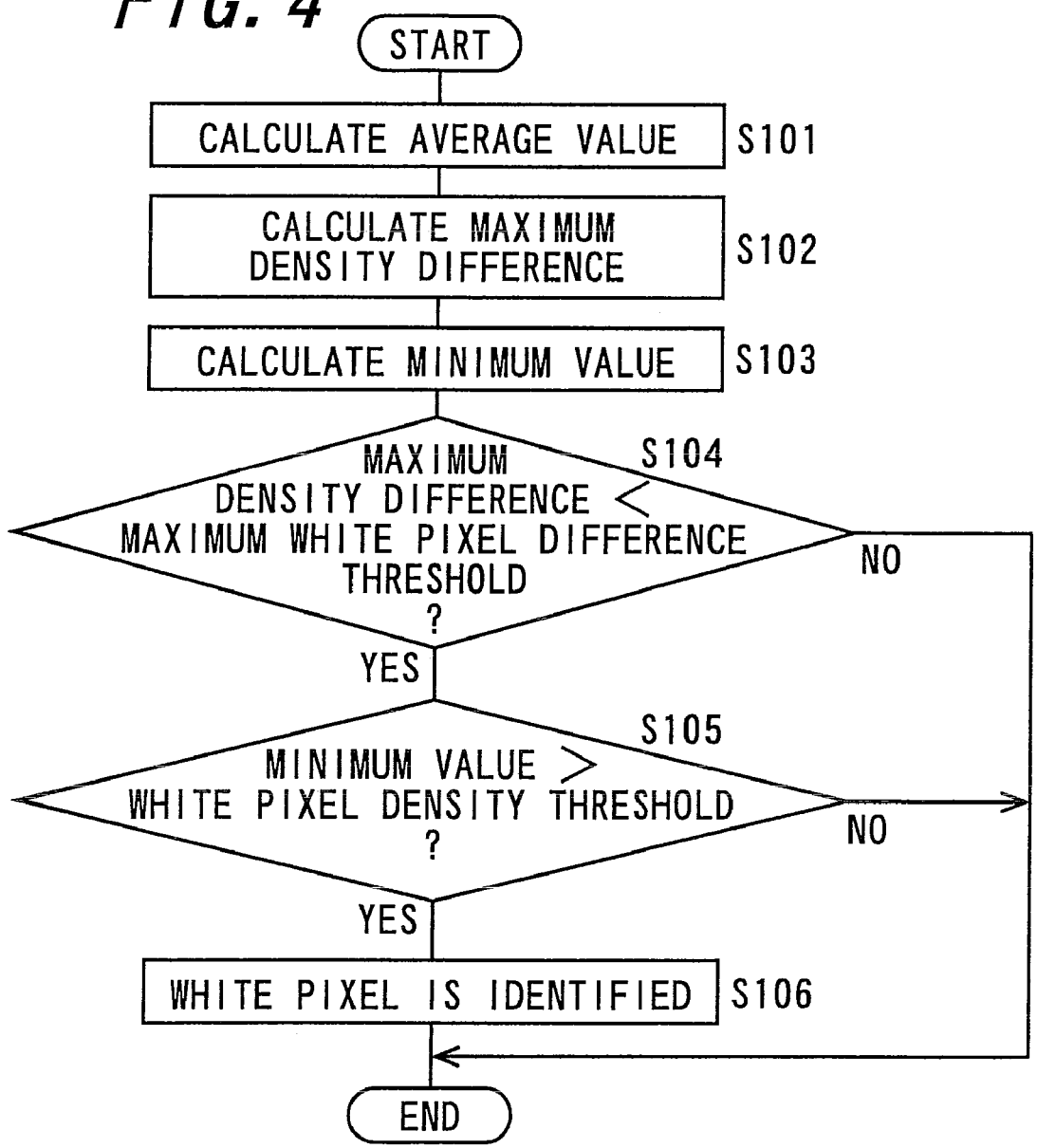
FIG. 4 is a flowchart showing a determination process for a white pixel.

FIG. 4 is a flowchart showing a determination process for a white pixel.

First, in step S101, in the n-by-m pixels block (e.g., 5×5 pixels) including the pixel of interest, average values of density values are calculated for respective color components, and further in step S102 a maximum density difference in the average values for respective color components is calculated, then in step S103 a minimum value in the average values for respective color components is calculated.

In step S104, the maximum density difference in the average values is compared with a maximum white pixel difference threshold (e.g., 5). When the maximum density difference in the average values is less than the maximum white pixel difference threshold, the process further proceeds to step S105, and the minimum value of the average values is compared with the white pixel density threshold (e.g., 240). When the minimum value of the average values is greater than the white pixel density threshold, it is determined that the pixel of interest is a white pixel in step S106. When the maximum density difference in the average values is greater than the maximum white pixel difference threshold in step S104, or when the minimum value of the average values is less than the white pixel density threshold, it is determined that the pixel of interest is not a white pixel.

With regard to respective pixels to be determined in the pixel determining section 21, the pixels may be pre-scanned or image data once stored in a storage section such as a hard disk drive may be used.

With regard to respective pixels determined by the pixel determining section 21 (area pixels, color pixels, and white pixels), the number of area pixels is counted in step S4 by the area pixel counting section 28, the number of color pixels is counted in step S5 by the color pixel counting section 30 and the number of white pixels is counted in step S6 by the white pixel counting section 24.

Next, in step S7, it is judged whether or not the determination processes for all pixels has been completed. When it has not been completed, the process proceeds to a next pixel of interest and the above determination processes are repeated.

When it has been completed, with regard to the pixel of interest identified as a page background pixel in the area pixels in step S8, the average values of the page background pixels for the respective planes (respective color components) are compared in step S9, a minimum value of the average values among respective color components is calculated for each pixel of interest, and then a minimum value histogram is generated by the histogram generating section 22. The number of density bins of the histogram is, for example, 16, by setting a first density bin, a second density bin, in an ascending order, and a sixteenth density bin for a bin of the largest pixel value.

In step 10, the page background determining section 23 determines how many types of page background exist. Examples of histograms for the case where only one page background type exists and the case where a plurality of page background types exists are shown in FIGS. 5A to 5D.

Figure 5A:
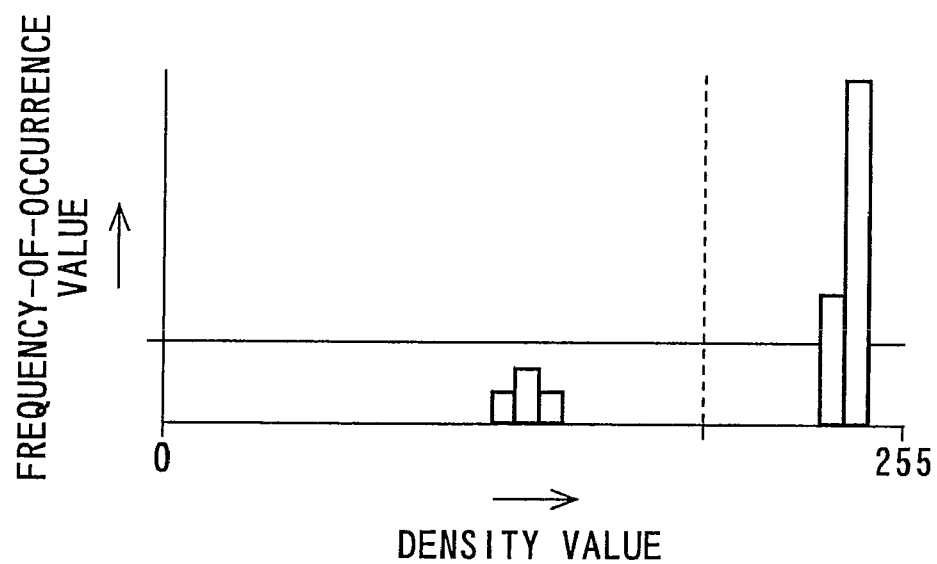
FIGS. 5A to 5D are views showing examples of the histogram generated by the histogram generating section.
Figure 5B:
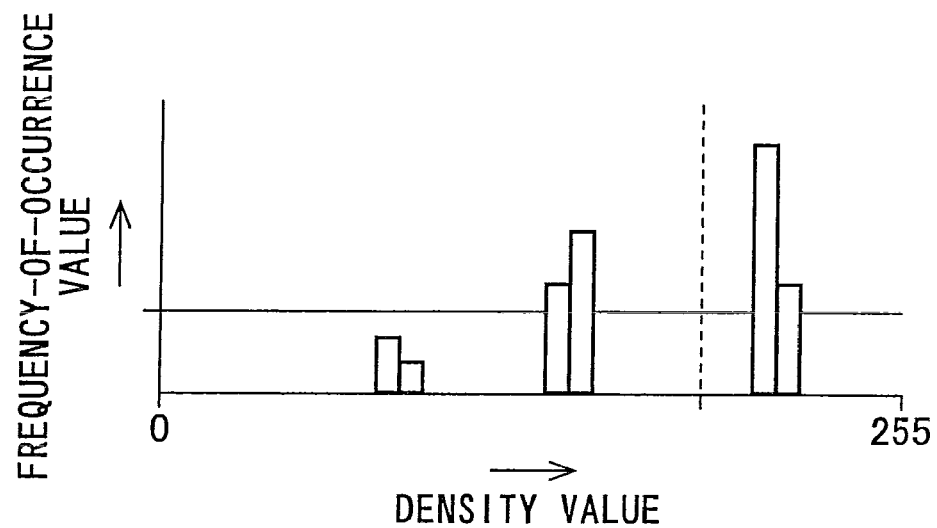

FIG. 5A shows a histogram for the case including only one page background type, and FIG. 5B shows a histogram for the case including a plurality of page background types. In the histograms, horizontal axes indicate density values representing density bins, and vertical axes thereof indicate a frequency-of-occurrence value representing a frequency of a minimum value belonging to the respective density bins.

Since there are only pixels in a monochrome density in page background, in the case where only one page background type exists, as shown in FIG. 5A, the frequency-of-occurrence value is present only in limited density bin group (e.g., a group of density bins composed of one to two bins). In the case where a plurality of page background types exists, as shown in FIG. 5B, there is a plurality of limited density bin groups in which the frequency-of-occurrence value are present, each of which density bin groups is, for example, a group composed of one to two bins.

The page background determining section 23 counts the number of density bin groups in which the frequency-of-occurrence values are greater than a page background determining threshold and their density bin width are less than a page background determining bin width threshold (e.g., 3), and identify the counted number as the number of page background types. The page background determining threshold is set to, for example, 10000, when the size of an output paper is assumed to be A4 size.

Furthermore, a density bin group having the highest density bin in pixel value is defined as a first page background, the lowest density bin value in the first page background is defined as the first page background density value, and a sum of a frequency-of-occurrence value belonging to the density bin group in the first page background is defined as a first page background frequency-of-occurrence value. In addition, when RGB signals are used, an actual density becomes higher as the pixel value is closer to "0" and becomes lower as the pixel value is closer to "255". In the embodiment, a case where the density becomes higher is expressed by "density value becomes smaller", and a case where the density becomes lower is expressed by "density value becomes larger".

In step S11, from the number of the page background types calculated by the page background determining section 23, the first page background density value, and the number of white pixels counted by the white pixel counting section 24, the document size determining section 25 judges whether a document size resetting is necessary or not.

FIG. 6 is a flowchart showing the document size determination process. In step S201, it is judged whether or not a plurality of page background types is present. When one page background is present, a document size is defined as a maximum readable size in step S204. When a plurality of page background types is present, there is possibility that data other than the document image data such as data of the pressing plate of the document cover is included as the page backgrounds, for example.

Thus, in step S202, the first page background density value and a white page background density threshold (e.g., density value 240) are compared. When the first page background density value is less than the white page background density threshold, data other than the document image data is not included and therefore document size is defined as a maximum readable size in step S204. In addition, the white page background density threshold can be set to a threshold including a density obtained by reading the pressing plate of the document cover, since the white page background density threshold is a threshold for removing data other than the document image data such as data of the pressing plate of the document cover.

As to the cases other than the above, the process proceeds to step S203 and a document size resetting is performed by using the number of white pixels, the first page background density value, and the first page background frequency-of-occurrence value.

In step S12, it is judged whether the document size is a maximum readable size or not. When the result of the document size determination process indicates that document size is the maximum readable size, the document size is determined to be the maximum readable size in step S18.

When the result of the document size determination process indicates that the document size resetting is necessary, the document size resetting is performed in step S13.

In step S13, thresholds are set to difference values between a total number of pixels in a maximum readable size and total numbers of pixels in standard sizes that are smaller than the maximum readable size. The thresholds are compared with the number of white pixels. For example, when a maximum readable size is A4 size and standard sizes are of series A and of series B, provided that the respective numbers of pixels are:

A4: $\alpha 1$;
B5: $\alpha 2$;
A5: $\alpha 3$;
B6: $\alpha 4$; and
A6: E5.

The document size determination thresholds $\beta 1$ to $\beta 4$ are set to:

$\beta 1 = \alpha 1 - \alpha 2$;

$\beta 2 = \alpha 1 - \alpha 3$;

$\beta 3 = \alpha 1 - \alpha 4$; and $\beta 4 = \alpha 1 - \alpha 5$.

In step S13, by comparing the document size determination thresholds with the number of white pixels, the document size resetting is performed as follows:

when the number of white pixels $\leq \beta 1$, the document size is reset to A4;

when $\beta 1 <$ the number of white pixels $\leq \beta 2$, the document size is reset to B5;

when $\beta 2 <$ the number of white pixels $\leq \beta 3$, the document size is reset to A5;

when $\beta 3 <$ the number of white pixels $\leq \beta 4$, the document size is reset to B6; and when $\beta 4 <$ the number of white pixels, the document size is reset to A6.

Figure 7:
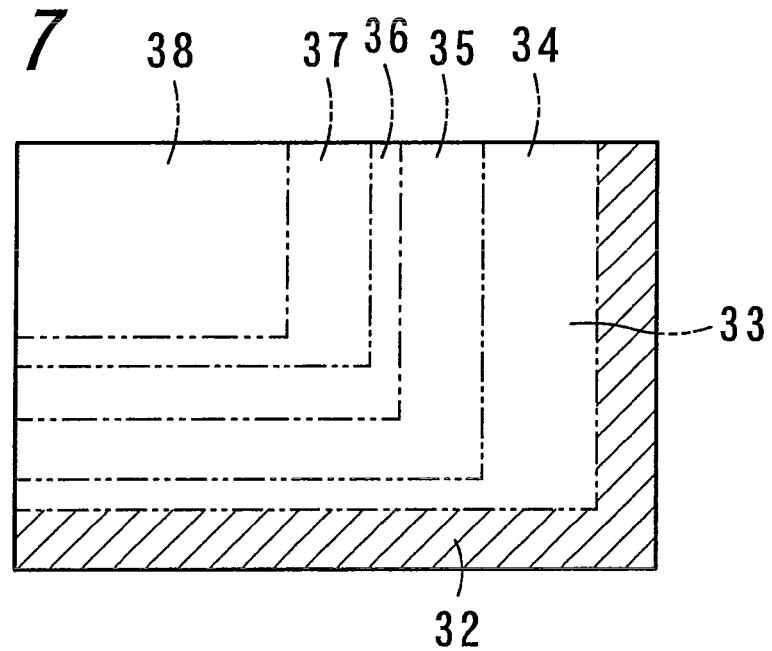
FIG. 7 is a schematic view showing respective document sizes on a scanner platen.

FIG. 7 is a schematic view showing respective document sizes on a scanner platen 32.

In the case of reading document image data, an area within a read-in area 33 on the scanner platen 32 is read. In the above examples, the document sizes are, for example, A4 size, A5 size, A6 size, B5 size and B6 size. As to areas occupied by the respective document sizes, the area 34 occupied by A4 size is the maximum readable area and the areas decrease in order of an area 35 for B5 size, an area 36 for A5 size, an area 37 for B6 size and an area 38 for A6 size.

The number of white pixels includes the number of white pixels constituting document image data. However, since the percentage of the white pixels arising from reading the pressing plate of the document cover is large, a document size of the document image data can be determined by comparing the difference values between the total number of pixels in the maximum readable size and the total numbers of pixels in the standard sizes that are smaller than the maximum readable size with such a number of white pixels.

Hereinbefore, the case where a maximum readable size is A4 size is explained. However, instead of the maximum readable size, a reading range of the image reading apparatus (document reading apparatus) including a maximum readable size and data of the document cover can be set.

Figure 5C:
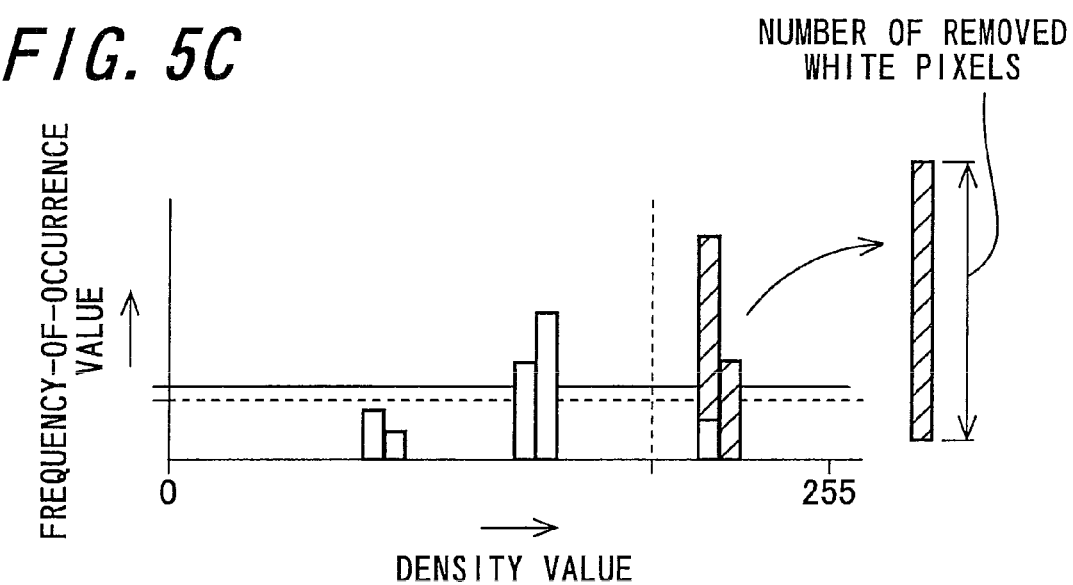

In step S14, the histogram regenerating section 26 determines a number of removal white pixels based on a size that has been reset by the document size determining section 25 and regenerates a histogram. Here, the histogram regenerating section 26 serves as a removal pixel-number determining section. In regenerating the histogram, for example, as shown in FIG. 5C, a frequency-of-occurrence value for the determined number of removal white pixels is removed from a higher density bin side of the histogram generated by the histogram generating section 22.

The number of removal white pixels is a value obtained by subtracting the total number of pixels in a reset document size from the total number of pixels in the maximum readable size. The numbers of removal white pixels, for example, are given by the following numbers of pixels:

when the reset document size is A4 size, the number of removal white pixels is 0;

when the reset document size is B5 size, the number of removal white pixels is $\gamma 1 = \alpha 1 - \alpha 2$;

when the reset document size is A5 size, the number of removal white pixels is $\gamma 2 = \alpha 1 - \alpha 3$;

when the reset document size is B6 size, the number of removal white pixels is $\gamma 3 = \alpha 1 - \alpha 4$; and when the reset document size is A6 size, the number of removal white pixels is $\gamma 4 = \alpha 1 - \alpha 5$.

In addition, the color of the pressing plate of the document cover is assumed to be white, however, in accordance with a color of the pressing plate of a document cover, a density threshold is adjusted for detecting pixels corresponding thereto. For example, when the color of the pressing plate of a document cover is gray (e.g., density value 128), a threshold for detecting gray pixels is between 118 and 138.

Figure 5D:
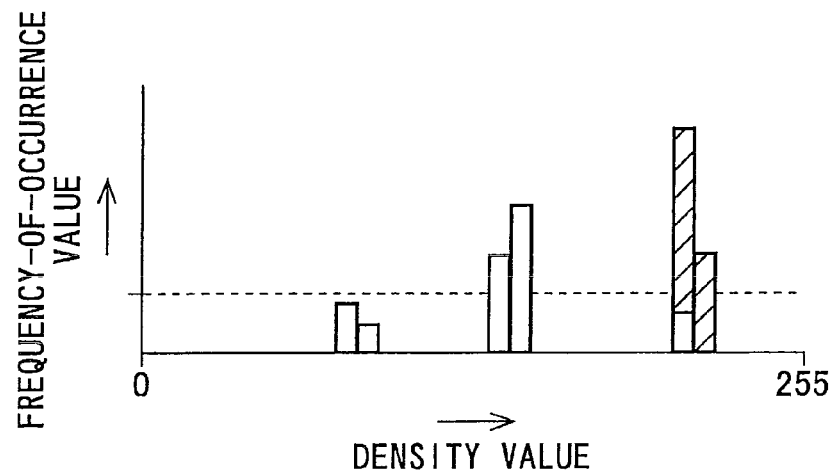

In step S15, as shown in FIG. 5D, the page background redetermining section 27 performs the determination of the page background based on a regenerated histogram that has been generated by the histogram regenerating section 26.

The determination process in the page background redetermining section 27 is the same as the process performed in the the page background determining section 23, except only that the histogram to be a processing object is changed to the regenerated histogram.

An existing removal process can be used for the page background removal process. For example, a method disclosed in Japanese Unexamined Patent Publication 2000-354167 can be used. For example, when the first page background is determined to be a page background, a page background removal process is performed by selecting a correction quantity table corresponding to the first page background density value.

In step 16, the document type determining section 29 determines a document type based on the document size determined by the document size determining section 25. As to thresholds used for the determination, thresholds for respective document sizes may be previously prepared or a document size depending threshold (reset threshold) which is recalculated from a ratio of the document size determined by the document size determining section 25 to an output paper size may be used. Specifically, the threshold is given by the following expression: (Reset threshold)=(Threshold corresponding to maximum readable size)×(Number of pixels for determined document size)/(Number of pixels for maximum readable size).

As to a method for determining a document type, a type of an entire document is determined by comparing the number of area pixels counted by the area pixel counting section 28 with predetermined thresholds respectively corresponding to a page background area, a photograph area, a halftone area and a text area. For example, in the case where detection accuracy is high in an ascending order of text, halftone, and photograph, the document is determined to be the text document when a ratio of pixel in the text area is more than 30% of the total number of pixels, the halftone document (printed-picture document) when a ratio of pixel in a halftone area is more than 20% of the total number of pixels, and a photograph when a ratio of pixel in a photograph area is more than 10% of the total number of pixels. Further, when the ratio of a text area and the ratio of a halftone area are respectively equal to or more than the thresholds, it is determined that the document is a text/halftone document (text and printed-picture document).

In step S17, in the similar manner as the document type determining section 29, the color determining section 31 determines a color based on the document size that is determined by the document size determining section 25. As to thresholds used for determination, thresholds for respective document sizes may be previously prepared or a document size depending threshold which is recalculated from a ratio of the document size determined by the document size determining section 25 to the maximum readable size may be used.

An existing determination process can be used for the color determination process, for example, as the color pixel determination by the pixel determining section 21, the method disclosed in Japanese Unexamined Patent Publication JP-A 2005-286571 can be used. In this color pixel determination process, a histogram is generated for image data determined to be chromatic pixels, and, by analyzing the shape of the generated histogram, a determination whether or not the document should be color-copied is performed.

Specifically, a density value having a maximum frequency-of-occurrence value in a chromatic pixel histogram is detected and set to a maximum frequency-of-occurrence density value. Next, the maximum density value is compared with a density threshold which is a preset density threshold for a monochrome copy (e.g. 150). When the maximum frequency-of-occurrence density value is less than the density threshold, it is determined that the document should be color-copied; and when the maximum frequency-of-occurrence density value is greater than the density threshold, a total frequency-of-occurrence value (total frequency-of-occurrence value in a maximum density area) in an area with a predetermined density width centering on the maximum frequency-of-occurrence density value is calculated. A value of the density width is, for example, about ±8 centering on the maximum frequency-of-occurrence density value.

Next, the total frequency-of-occurrence value in the maximum density area is compared with a preset achromatic determination frequency-of-occurrence threshold. And when the total frequency-of-occurrence value in the maximum density area is greater than the achromatic determination frequency-of-occurrence threshold, it is determined that the document should be monochrome-copied; and when the total frequency-of-occurrence value in a maximum density area is less than the achromatic determination frequency-of-occurrence threshold, it is determined that the document should be color-copied.

The achromatic determination frequency-of-occurrence threshold is set as a ratio to the total number of pixels identified as chromatic pixels; it is set to a value, for example, 90% of the total number of chromatic pixels. Such a color determination process is carried out for respective signals, and a monochrome-photocopy is made only when it is determined for all signals that the document should be monochrome-copied.

In the above embodiment, an example is shown in which document size determination is performed in combination with the document type determination and color determination. However, the document size determination may be performed in parallel with the document type determination of document type and the color determination.

Figure 8:
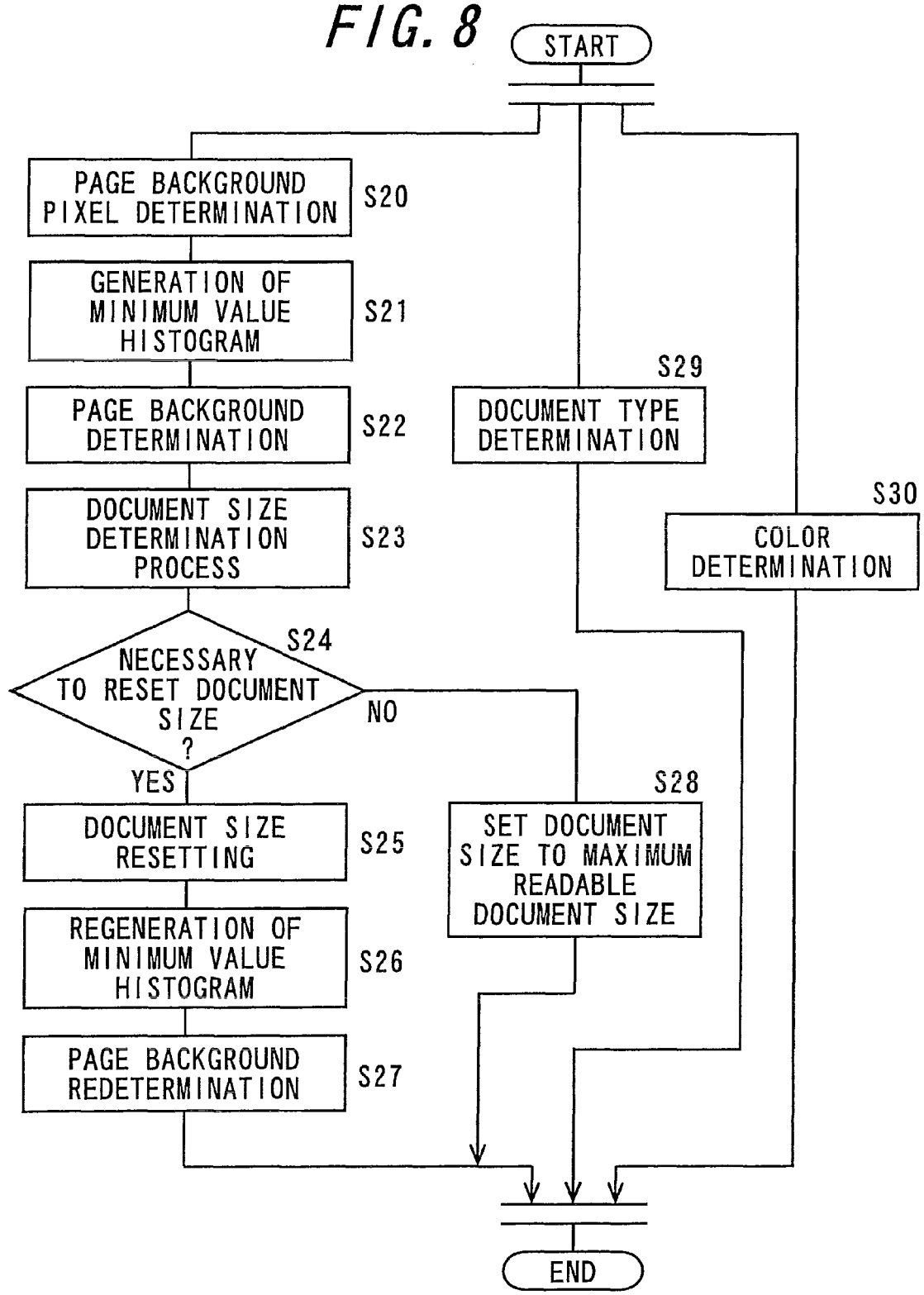
FIG. 8 is a flowchart showing a discrimination process by a document features automatic discrimination section according to another embodiment of the invention.

FIG. 8 is a flowchart showing a determination process by a document features automatic discrimination section 13 according to another embodiment of the invention.

Since a determination of document size is performed by extracting page background pixels in an area pixels, in step S20, a determination of page background pixels is also performed.

In step S21, a minimum value among average values of respective color components of the page background pixels is calculated, and a minimum value histogram is generated by the histogram generating section 22. Further, in step S22, the page background determining section 23 determines how many types of page backgrounds exist. In step S23, from the number of page background types calculated by the page background determining section 23, the first page background density value, and the number of white pixels counted by the white pixel counting section 24, the document size determining section 25 judges whether a document size resetting is necessary or not.

It is judged whether the document size resetting is necessary or not (step S24), and when the document size resetting is not necessary, in step S28, a document size is set to a maximum readable size. When the document size resetting is necessary, in step S25, difference values between the total number of pixels for a maximum readable size and the total numbers of pixels for standard sizes that are smaller than the maximum readable size are set to thresholds, and the document size is reset by comparing the thresholds with the number of white pixels. A minimum value histogram is regenerated in step 26 and a page background is redetermined in step 27.

In parallel with these processes, a document type determination (step S29) and a color determination (step S30) are performed. In these determination processes, when a document size resetting is necessary, a reset document size is inputted, and when the document size resetting is not necessary, a maximum readable size is inputted, and then respective determination processes are performed. In addition, when the document size resetting is determined to be necessary, the document type determination and the color determination are performed using the reset document size, however, the respective determination processes may be performed after the document size determination or may be performed before the document size determination and the respective determination processes may be performed again when the document size is reset.

Furthermore, for example, a method disclosed in Japanese Unexamined Patent Publication JP-A 2000-354167 can be used for the determination of page background pixels. In this method, the G signal is first extracted from input image data, and, for example, 256 levels of density are divided by 16 bins and a histogram is generated. In areas having pixel value which is equal to or greater than a minimum value to be judged as a page background (the first threshold) and having a number of pixels which is equal to or greater than a minimum value to be judged as a page background (the second threshold), that is, in areas considered to be page backgrounds, density bins are searched starting from smaller pixel values and the density bin (class value) that is greater than the first threshold is extracted as a page background.

In addition, instead of the G signal, a luminance signal calculated from RGB components based on the following converting equation may be used.

$$Y_j = 0.30 R_j + 0.59 G_j + 0.11 B_j$$

Here, $Y_j$ is a luminance component, and $R_j$, $G_j$ and $B_j$ represent respective color components.

Figure 9:
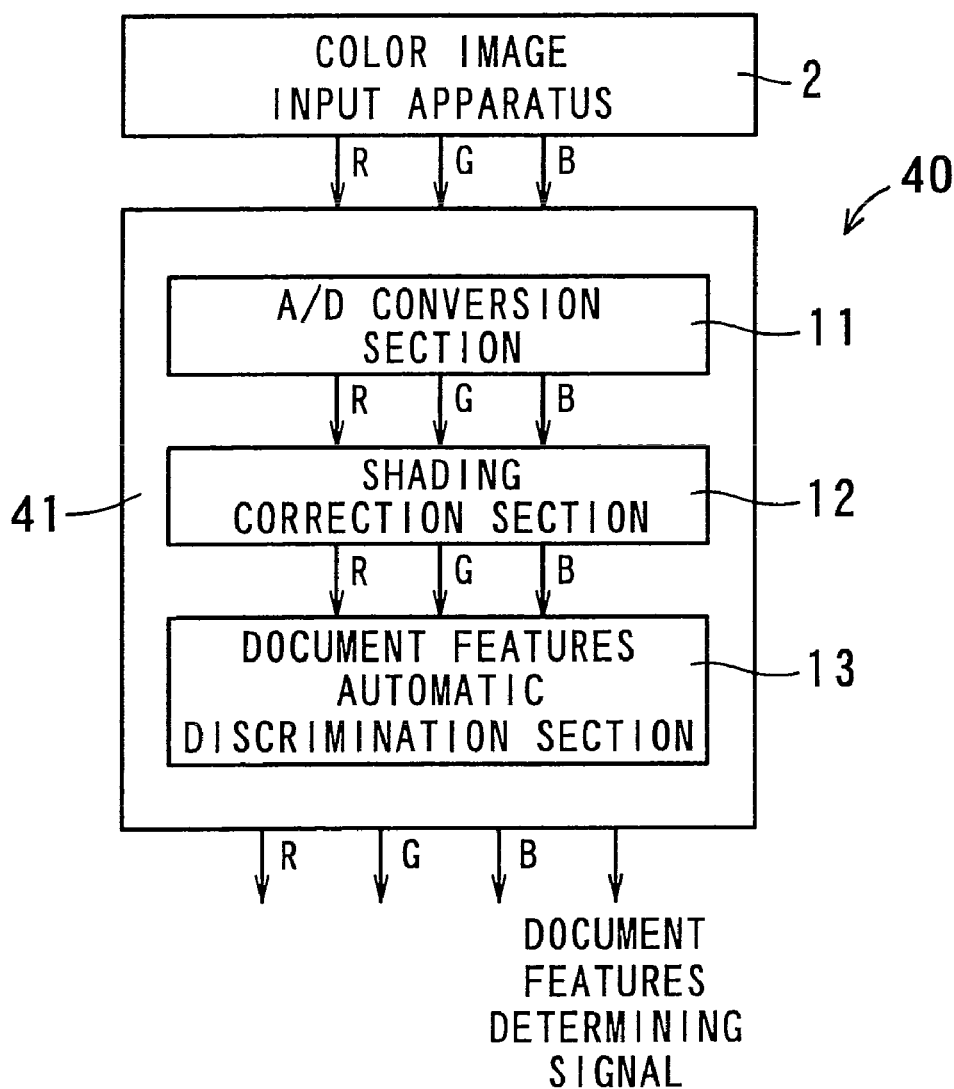
FIG. 9 is a block diagram showing a configuration of an image reading apparatus according to still another embodiment of the invention.

FIG. 9 is a block diagram showing a configuration of an image reading apparatus 40 according to still another embodiment of the invention. The image reading apparatus 40 is implemented by, for example, a flatbed scanner or the like.

As shown in FIG. 9, the image reading apparatus 40 includes the color image input apparatus 2 and a color image processing apparatus 41. The color image processing apparatus 41 includes the A/D conversion section 11, the shading correction section 12 and the document features automatic discrimination section 13. Those parts that perform the same operations as the embodiment shown in FIG. 1 are denoted by the same reference numerals.

The color image input apparatus 2 includes, for example, a scanner section having a CCD image sensor, and reads a reflected light image from a document by the CCD image sensor as analogue signals of RGB (R: Red, G: Green, and B: Blue) and inputs the analogue signals to the color image processing apparatus 41. The analogue signals read by the color image input apparatus 2 is transmitted to the A/D conversion section 11, the shading correction section 12, and the document features automatic discrimination section 13 in this order in the color image processing apparatus 41.

The A/D conversion section 11 converts analogue signals of RGB into digital signals. The shading correction section 12 performs a process of removing various distortions occurring in a lighting system, an image focusing system, and an image sensing system of the color image input apparatus 2, to a digital RGB signal transmitted from the A/D conversion section 11. Also, the shading correction section 12 makes a color balance adjustment. Further, the shading correction section 12 converts RGB reflectivity signals to density signals.

The document features automatic discrimination section 13 converts the RGB signals (RGB reflectivity signals) from which various distortions have been removed and on which a color balance adjustment has been made by the shading correction section, into signals, such as density signals, which are easy for the color image processing apparatus 41 to process, and performs a document size determination. Based on the determined document size, a threshold and a histogram that have been set for image data of an output paper size (maximum size) and a discrimination whether or not the document should be color copied (color determination), a document type discrimination such as whether the document is a text document or a printed-picture document or a text and printed-picture document including both text and a printed-picture (document type determination) and a discrimination whether the document should be processed by a page background removal process or not (page background determination) are made. The image data and the document features discrimination signal outputted from the image reading apparatus 40 are transmitted to a printer, a copier or a computer.

In the above embodiment, the document features automatic discrimination section 13 includes the document type determining section 29 and the color determining section 31. However, these determining sections may be provided separately from the pixel determining section 21, the histogram generating section 22, the page background determining section 23, the document size determining section 25, the histogram regenerating section 26 and the page background redetermining section 27. Then, based on the detection result of the document size, the document type determination and the color determination may be performed. When the invention is implemented by the image reading apparatus 40, a signal indicating a document size is outputted from the image reading apparatus 40 together with image data.

In another embodiment of the invention, a document size can be determined by an image input apparatus when document image data read from a document to be conveyed is inputted as document image data.

Figure 10:
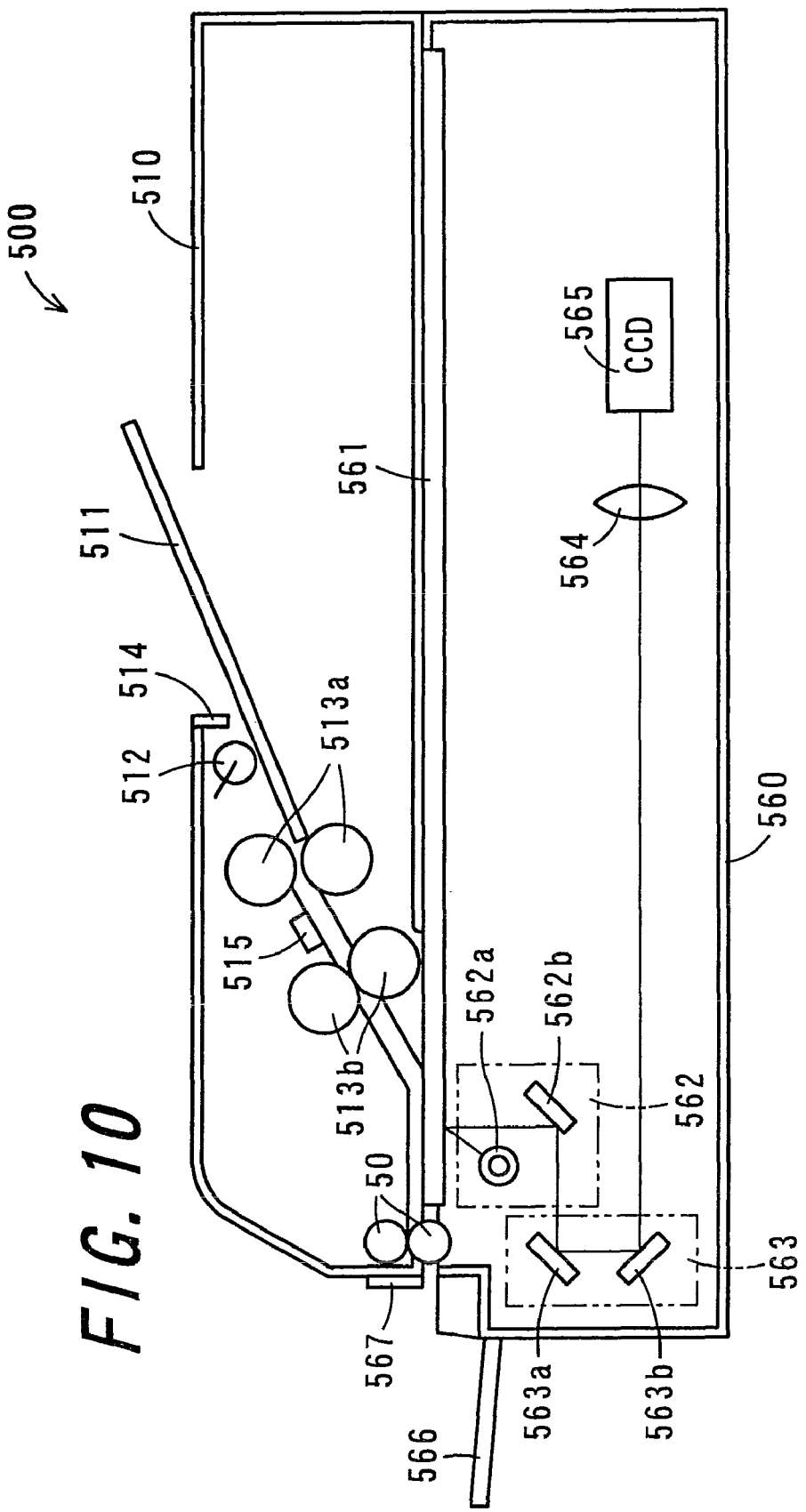
FIG. 10 is a schematic view showing a constitution of an image input apparatus.

FIG. 10 is a schematic view showing a configuration of the image input apparatus 500. The image input apparatus 500 is a document reading apparatus which is provided with a document conveyance section including an upper housing 510 and a scanner section including a lower housing 560 and others, and can read document image data from a document to be conveyed.

In the image reading apparatus 500, reading of image is performed from a document in a static scanning mode in which an image is read from a document kept still and in a conveyance scanning mode in which an image is scanned from a document being conveyed. These scanning modes are selected and operated, for example, by a mode selecting instruction inputted by the operation panel 5.

In addition, upon pressing a copy button in a state where the document is set in a document set tray 511 and the document is detected by a document set detecting sensor 514, the image reading apparatus can be set to operate in the conveyance scanning mode. Furthermore, upon pressing the copy button in a state where no document is set in the document set tray 511 and a state where no document is detected by the document set detecting sensor, the image reading apparatus can be set to operate in the static scanning mode.

The upper housing 510 is provided with a document set sensor 514 for detecting a document placed on the document tray 511, a pick-up roller 512 for picking a document up sheet by sheet, conveyance rollers 513a and 513b for conveying a document so as to read an image on the document, document output rollers 50 for outputting the document, a document output sensor 567 for detecting a document outputted, and others.

The conveyance rollers 513b have an electromagnetic clutch at drive shafts thereof, by which electromagnetic clutch transmission of drive force from a driving motor can be controlled, and come to a standstill in the absence of the document. When a front end of the document is brought into contact with the conveyance timing sensor 515 and a predetermined signal is transmitted from the conveyance timing sensor 515, the conveyance rollers 513b rotate so as to convey the document downstream. When the front end of the document conveyed from an upstream side is brought into contact with a nip portion of the conveyance rollers 513b being in a stopped state, the document deforms to some extent, and thereafter, the conveyance rollers 513b rotates so as to convey the document downstream. At this time, with the aid of the nip portion of the conveyance rollers 513b, a side of the front end of the document is aligned to be perpendicular to the conveyance direction.

The lower housing 560 is provided with scanning units 562 and 563 which reciprocate in parallel along a lower surface of a document platen 561, an imaging lens 564, a CCD line sensor 565 that is a photoelectric conversion element, an output tray 566, and others. The scanning unit 562 includes a light source 562a for exposing a document conveyed from the document tray 511 or a document placed on the document platen 561 to light (e.g., a halogen lamp), a mirror 562b for guiding light reflected from the document toward a predetermined optical path, and others. Further, the scanning unit 563 includes mirrors 563a and 563b for guiding the light reflected from a document toward the predetermined optical path, and others.

The imaging lens 564 leads the reflected light from the scanning unit 563 and forms an optical image onto a predetermined position on the CCD line sensor 565. The CCD line sensor 565 outputs electrical signals by photoelectrically converting the optical image. In other words, the CCD line sensor 565 outputs pieces of data obtained by separating the reflected light from the surface of the document into respective color components of R (Red), G (Green), and B (Blue), to the color image processing apparatus 3.

The color image processing apparatus 3 estimates a document size for the document image data that is read in a document conveyance mode. The document image data inputted from the image input apparatus 500 is temporally stored in a memory portion such as a hard disc drive, and document features thereof are discriminated in the same manner as in the above embodiment.

Document features are discriminated by the document features automatic discrimination section 13 shown in FIG. 2, based on the flowchart shown in FIG. 3. However, in the flowchart, the document size resetting in step S13 and the regeneration of the minimum value histogram in step S14 are different from those of the above embodiment.

In the embodiment, in step S13, the first document size is first estimated, based on a length in the sub-scanning direction for the input document image data (hereinafter referred to as "sub-scanning direction size").

The document image data read by the image input apparatus 500 in the document conveyance mode is read in a maximum readable size (e.g., A3 size) in the main scanning direction, whereas, in the sub-scanning direction, as a result of document conveyance, the length of the document image data is equal to the length of the document, since the document is read from a front end of the document in the conveyance direction to a tail end thereof in the conveyance direction.

When a plurality of the first document sizes are estimated, difference values of the respective total number of pixels in the plurality of the estimated document sizes are set to thresholds, and the second document size is determined by comparing the thresholds with the number of white pixels.

For example, when a maximum readable size is A3 size (A3 longitudinal direction) and standard sizes are of series A and of series B, a main scanning direction size (the number of pixels), a sub-scanning direction size (the number of pixels), and a number of total pixels are respectively set to as follows:

A3: the main scanning direction size is M1, the sub-scanning direction size is S1, and the number of total pixels is $\alpha 1$ (M1×S1);

B4: the main scanning direction is M2, the sub-scanning direction size is S2, and the number of total pixels is $\alpha 2$ (M2×S2);

A4: the main scanning direction size is M3, the sub-scanning direction size is S3, and the number of total pixels is $\alpha 3$ (M3×S3);

B5: the main scanning direction size is M4, the sub-scanning direction size is S4, and the number of total pixels is $\alpha 4$ (M4×S4);

A5: the main scanning direction size is M5, the sub-scanning direction size is S5, and the number of total pixels is $\alpha 5$ (M2×S2);

B6: the main scanning direction size is M6, the sub-scanning direction size is S6, and the number of total pixels is $\alpha 6$ (M6×S2); and A6: the main scanning direction size is M7, the sub-scanning direction size is S7, and the number of total pixels is $\alpha 7$ (M7×S7). Here, the size in the sub-scanning direction is assumed to be longer than the size in the main scanning direction.

Figure 11:
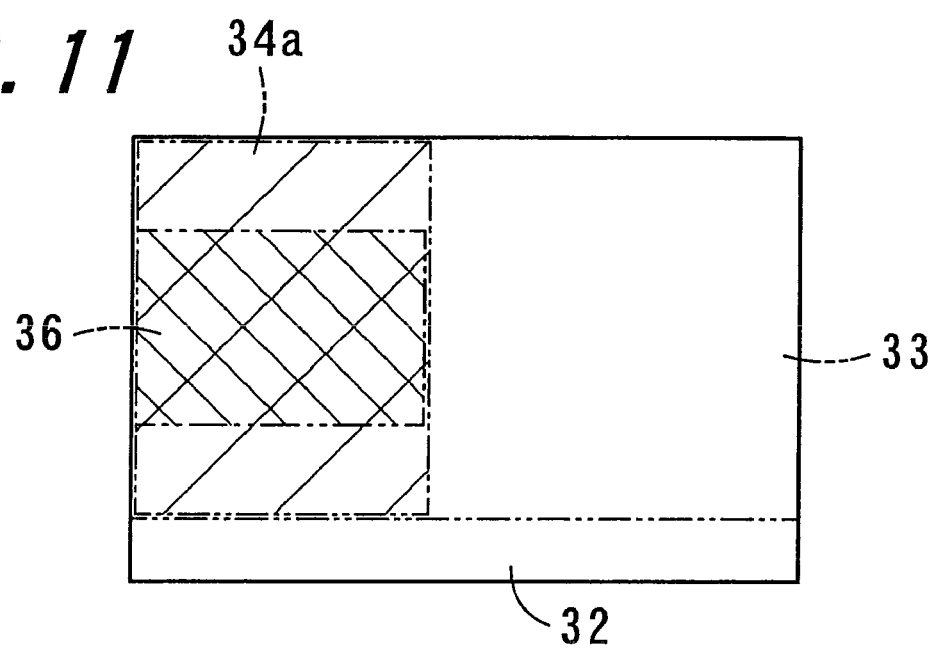
FIG. 11 is a schematic view showing respective document sizes on the scanner platen.
Figure 12:
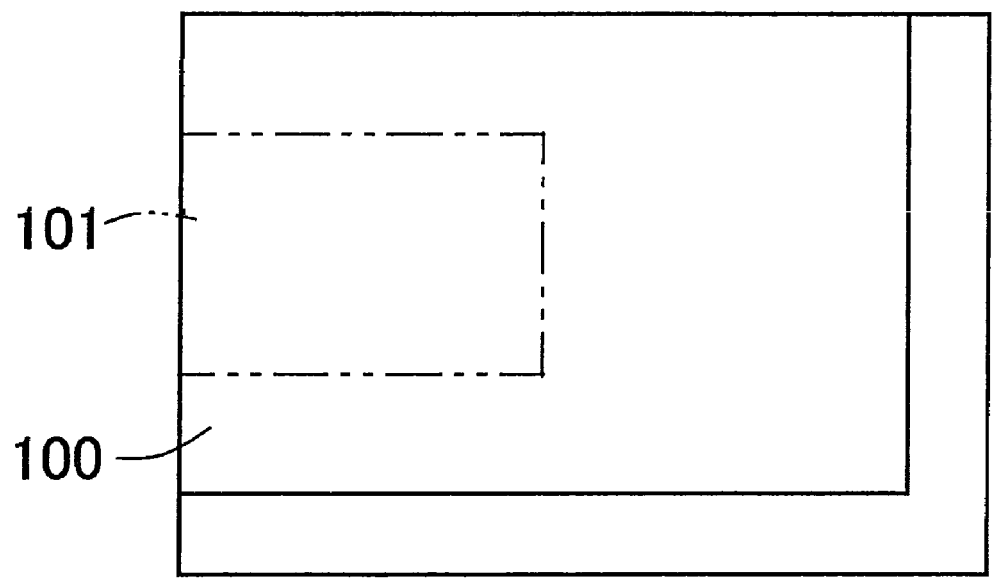
FIG. 12 is a view showing an example of a discrimination object area which has been set.
Figure 13:
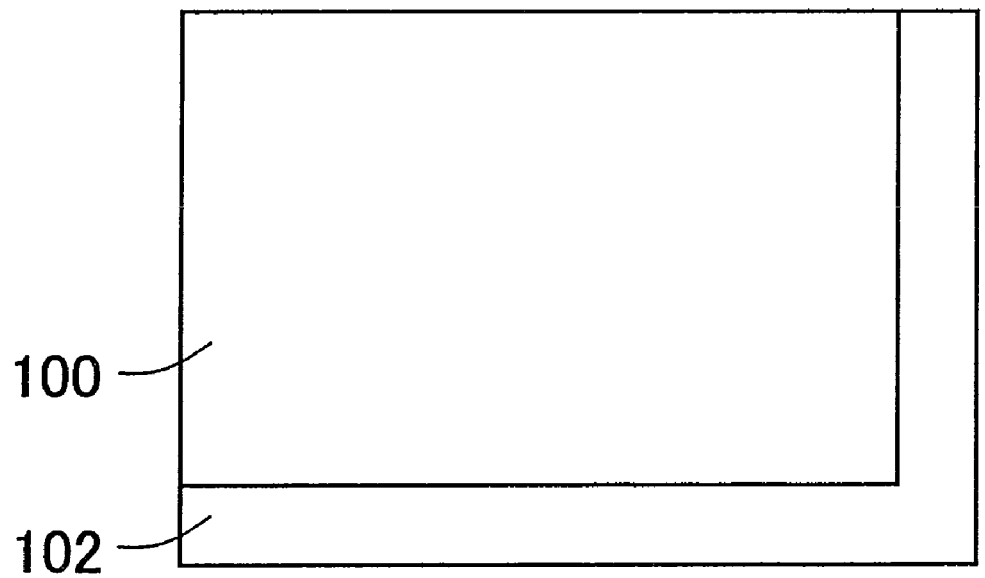
FIG. 13 is a view showing an example of a discrimination object area which has been set.

The reason why a plurality of first document sizes are estimated is that, when the standard sizes are of series A and of series B, there is a case the longitudinal length and the lateral length of respective sizes are equal. For example, as shown in a schematic view of FIG. 11, when the read-in area 33 on the scanner platen 32 is read, the longitudinal length of the area 36 of A5 size is equal to the lateral length of an area 34a of A4 size. A size of document image data in the sub-scanning direction when the document of A5 size is read by aligning the conveyance direction with a longitudinal direction is equal to a size of document image data in a sub-scanning direction when the document of A4 size is read by aligning the conveyance direction with a lateral direction.

Based on such a size of document image data in the sub-scanning direction, the first document size is estimated as follows:

when the sub-scanning direction size of the document image data is S1, the first document size is A3 alone;

when the sub-scanning direction size of the document image data is S2, the first document size is B4 alone;

when the sub-scanning direction size of the document image data is S3, the first document size is A4 alone;

when the sub-scanning direction size of the document image data is S4, the first document size is A5 alone;

when the sub-scanning direction size of the document image data is S5, the first document size is A4 or A5;

when the sub-scanning direction size of the document image data is S6, the first document size is B5 or B6;

when the sub-scanning direction size of the document image data is S7, the first document size is A5 or A6;

when the sub-scanning direction size of the document image data is M6, the first document size is B6 alone; and when the sub-scanning direction size of the document image data is M7, the first document size is A6 alone.

When the sub-scanning direction size of the document image data is S5, S6, or S7, the plurality of the first document sizes are estimated, and therefore, with further estimations, a second document size to be a final result of the document size determination is determined.

The determination of the second document size is performed by setting difference values of the respective total numbers of pixels in the plurality of the estimated document sizes as thresholds and comparing the number of white pixels with the thresholds.

The document size determination thresholds β5, β6, and β7 are set to:

β5=α3−α5, when the sub-scanning direction size of the document image data is S5;
β6=α4−α6, when the sub-scanning direction size of the document image data is S6; and
β7=α5−α7, when the sub-scanning direction size of the document image data is S7.

By comparing the determined document size determination thresholds β5, β6, and β7 with the number of white pixels, the determination of the second document size is performed as follows:

when the sub-scanning direction size of the document image data is S5, the second document size is determined to be:
  A4, in the case of (the number of white pixels)≦β5; and
  A5, in the case of (the number of white pixels)>β5, when the sub-scanning direction size of the document image data is S6, the second document size is determined to be:
  B5, in the case of (the number of white pixels)≦β6; and
  B6, in the case of (the number of white pixels)>β6, and when the sub-scanning direction size of the document image data is S7, the second document size is determined to be:
  A5, in the case of (the number of white pixels)≦β7; and
  A6, in the case of (the number of white pixels)>β7.

The second document size determined in this manner is a reset document size.

When the size of document image data in the sub-scanning direction is other than S5, S6, and S7, the first document size is determined to be the second document size as it is, since there is only one first document size to be estimated. The second document size determined is set to the reset document size.

In the above, the case where the maximum readable size is A3 size is explained. However, instead of the maximum readable size, a reading area of the image reading apparatus including the maximum readable size and data of the document cover may be set as the maximum readable size.

In step S14, the histogram regenerating section 26 determines the number of removal white pixels, based on a size that has been reset by the document size determining section 25, and regenerates a histogram. In regenerating the histogram, the frequency-of-occurrence value corresponding to the determined number of removal white pixels is removed from a higher density bin side of the histogram generated by the histogram generating section 22.

The number of removal white pixels is determined from the size of the document image data in the sub-scanning direction and the reset document size which has been reset. The number of removal white pixels is, for example, given by the following number of pixels:

the number of removal white pixels is 0, when the sub-scanning direction size of the document image data is S1;
the number of removal white pixels is M1×S2−α2, when the sub-scanning direction size of the document image data is S2;
the number of removal white pixels is M1×S3−α3, when the sub-scanning direction size of the document image data is S3;
the number of removal white pixels is M1×S4−α4, when the sub-scanning direction size of the document image data is S4;
the number of removal white pixels is 0, when the sub-scanning direction size of the document image data is S5 and a reset document size is A4;
the number of removal white pixels is M1×S5−α5, when the sub-scanning direction size of the document image data is S5 and the reset document size is A5;
the number of removal white pixels is M1×S6−α4, when the sub-scanning direction size of the document image data is S6 and the reset document size is B5;
the number of removal white pixels is M1×S6−α6, when the sub-scanning direction size of the document image data is S6 and the reset document size is B6;
the number of removal white pixels is M1×S7−α5, when the sub-scanning direction size of the document image data is S7 and the reset document size is A5;
the number of removal white pixels is M1×S7−α7, when the sub-scanning direction size of the document image data is S7 and the reset document size is A6;
the number of removal white pixels is M1×M6−α6, when the sub-scanning direction size of the document image data is M6; and
the number of removal white pixels is M1×M7−α7, when the sub-scanning direction size of the document image data is M7.

In addition, the color of the pressing plate of the document cover is assumed to be white, however, a white pixel density threshold in detecting a white pixel may be adjusted, according to a color of the pressing plate of the document cover. For example, when the color of a pressing plate of a document cover is gray (e.g., density value 128), the same process is performed after changing the density range set as the threshold to a white pixel from "240-255" to "118-138".

Further, as another embodiment of the invention, it is also possible to record an image processing program that carries out the above document size determination and document features determination, on a computer-readable recording medium on which a program to be executed by a computer can be recorded.

Accordingly, the recording medium on which the program code (an executable program, an intermediate code program, and a source program) is recorded that executes an image process to determine a document size and discriminate document features can be portably provided.

Note that in the present embodiment, as the recording medium, a memory which is not shown because processes are performed by a microcomputer, e.g., a ROM (Read Only Memory), itself may serve as a program medium, or alternatively, a program reading apparatus, although not shown, may be provided as an external storage apparatus and by inserting the recording medium thereinto, the apparatus may serve as a readable program medium.

In any case, a stored program may be executed by a microprocessor accessing the program, or in any case, a scheme may be employed in which a program code is read, the read program code is downloaded into a program storage area (not shown) of a microcomputer, and the program is executed. The program for download is stored in advance in a main body apparatus.

Here, the above program medium is a recording medium configured to be separable from a main body, and may be a medium that fixedly carries a program code thereon, including a tape type, such as a magnetic tape or cassette tape, a disk type including a magnetic disk such as a flexible disk or hard disk or an optical disk such as a CD-ROM/MO/MD/DVD, a card type, such as an IC card (including a memory card)/optical card, or a semiconductor memory such as a mask ROM, EPROM (Erasable Programmable Read Only Memory), EEPROM (Electrically Erasable Programmable Read Only Memory), or flash ROM.

In the present embodiment, since a system configuration is capable of connecting a communication network including the Internet, the program medium may be a medium that carries thereon a program code such that a program code is downloaded from the communication network in a streaming manner. Note that when a program code is thus downloaded from the communication network, the program for download may be stored in advance in a main body apparatus or may be installed from another recording medium. Note also that the invention can also be implemented in the form of a computer data signal in which the above program code is embodied by electronic transmission and which is embedded in a carrier wave.

The above recording medium is read by a program reading apparatus included in a digital color image forming apparatus or computer system, whereby the aforementioned image processing method is performed.

A computer system includes an image input apparatus such as a flatbed scanner, film scanner, or digital camera; a computer that performs various processes, such as the aforementioned image processing method, by a predetermined program being loaded; an image display device, such as a CRT display or liquid crystal display, that displays processing results produced by the computer; and a printer that outputs the processing results produced by the computer to paper, etc. The computer system further includes a network card, a modem, etc., that serve as a communicating section for establishing a connection to a server, etc., through a network.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus comprising:
    a page background determining section to which document image data corresponding to a document image of a document having been read is inputted and which extracts candidates for page background pixels from the input document image data and determines a number of page background types;
    a white pixel extracting section which extracts white pixels from the input document image data; and
    a document size determining section which determines a document size of the input document image data, based on the number of page backgrounds types determined by the page background determining section, a page background density value which is the lowest density value in one or a plurality of page background areas determined to be page backgrounds, and a number of white pixels extracted by the white pixel extracting section,
    wherein, the page background determining section determines that a plurality of page background types exists, the page background density value is compared with a predetermined white page background density threshold, and the document size determining section redetermines the document size when the page background density value is greater than the white page background threshold
    wherein the image processing apparatus further comprises a removal pixel-number determining section which determines a number of pixels to be removed from the candidates for page background pixels based on the redetermined document size, and
    wherein the page background determining section redetermines a page background using a number of pixels in which the number of removal pixels are removed from the number of white pixels.

2. An image forming apparatus comprising the image processing apparatus of claim 1.

3. The image processing apparatus of claim 1, wherein the document size determining section calculates difference values between a number of pixels in a maximum readable document size and numbers of pixels in document sizes that are smaller than the maximum readable document size, sequentially compares the calculated difference values with the number of white pixels that is extracted by the white pixel extracting section, determines a range of the difference values that the number of white pixels satisfies, and, in accordance with the determined range of the difference values, determines the document size to be the maximum readable document size, a document size that is a size other than the maximum readable document size and a larger document size corresponding to the range of the difference values which the number of white pixels satisfy, or a minimum document size.

4. The image processing apparatus of claim 1, wherein the image processing apparatus is configured so as to be capable of inputting document image data from a document reading apparatus which reads document image data of a document to be conveyed,
    when the document image data is inputted from the document reading apparatus, the document size determining section redetermines the document size by estimating a first document size based on a size in a conveyance direction of the document image data which has been read, and, when a plurality of first document sizes are estimated, setting difference values between the respective total numbers of pixels in the plurality of the estimated document sizes to thresholds, comparing the number of white pixels with the thresholds, and thereby determining a second document size.

5. An image processing method comprising:
    a step of inputting document image data corresponding to a document image of a document having been read, extracting candidates for page background pixels from the input document image data and determining a number of page background types;
    a step of extracting white pixels from the input document image data; and
    a step of determining a document size of the input document image data, based on the number of page backgrounds types determined, a page background density value which is the lowest density value in one or a plurality of page background areas determined to be page backgrounds, and a number of white pixels extracted,
    wherein, when it is determined that a plurality of page background types exists, the page background density value is compared with a predetermined white page background density threshold, and the document size is redetermined when the page background density value is greater than the white page background threshold,
    wherein the method further comprises a step of
    determining a number of pixels to be removed from candidates for page background pixels based on the redetermined document size, and
    wherein a page background is redetermined using a number of pixels in which the number of removal pixels are removed from the number of white pixels.

6. An image processing apparatus comprising:
a page background determining section to which document image data corresponding to a document image of a document having been read is inputted and which extracts candidates for page background pixels from the input document image data and determines a number of page background types;
a white pixel extracting section which extracts white pixels from the input document image data; and
a document size determining section which determines a document size of the input document image data, based on the number of page backgrounds types determined by the page background determining section, a page background density value which is the lowest density value in one or a plurality of page background areas determined to be page backgrounds, and a number of white pixels extracted by the white pixel extracting section,
wherein, when the page background determining section determines that a plurality of page background types exists, the page background density value is compared with a predetermined white page background density threshold, and the document size determining section redetermines the document size when the page background density value is greater than the white page background threshold,
wherein the image processing apparatus further comprises a document type determining section which determines a document type based on the redetermined document size.

7. The image processing apparatus of claim 6, wherein the document size determining section calculates difference values between a number of pixels in a maximum readable document size and numbers of pixels in document sizes that are smaller than the maximum readable document size, sequentially compares the calculated difference values with the number of white pixels that is extracted by the white pixel extracting section, determines a range of the difference values that the number of white pixels satisfies, and, in accordance with the determined range of the difference values, determines the document size to be the maximum readable document size, a document size that is a size other than the maximum readable document size and a larger document size corresponding to the range of the difference values which the number of white pixels satisfy, or a minimum document size.

8. The image processing apparatus of claim 6, wherein the image processing apparatus is configured so as to be capable of inputting document image data from a document reading apparatus which reads document image data of a document to be conveyed,
when the document image data is inputted from the document reading apparatus, the document size determining section redetermines the document size by estimating a first document size based on a size in a conveyance direction of the document image data which has been read, and, when a plurality of first document sizes are estimated, setting difference values between the respective total numbers of pixels in the plurality of the estimated document sizes to thresholds, comparing the number of white pixels with the thresholds, and thereby determining a second document size.

9. An image forming apparatus comprising the image processing apparatus of claim 6.

10. An image processing apparatus comprising:
a page background determining section to which document image data corresponding to a document image of a document having been read is inputted and which extracts candidates for page background pixels from. the input document image data and determines a number of page background types;
a white pixel extracting section which extracts white pixels from the input document image data; and
a document size determining section which determines a document size of the input document image data, based on the number of page backgrounds types determined by the page background determining section, a page background density value which is the lowest density value in one or a plurality of page background areas determined to be page backgrounds, and a number of white pixels extracted by the white pixel extracting section,
wherein, when the page background determining section determines that a plurality of page background types exists, the page background density value is compared with a predetermined white page background density threshold, and the document size determining section redetermines the document size when the page background density value is greater than the white page background threshold,
wherein the image processing apparatus further comprises a color document determining section which performs the determination whether a document is a color document or a monochrome document based on the redetermined document size.

11. The image processing apparatus of claim 10, wherein the document size determining section calculates difference values between a number of pixels in a maximum readable document size and numbers of pixels in document sizes that are smaller than the maximum readable document size, sequentially compares the calculated difference values with the number of white pixels that is extracted by the white pixel extracting section, determines a range of the difference values that the number of white pixels satisfies, and, in accordance with the determined range of the difference values, determines the document size to be the maximum readable document size, a document size that is a size other than the maximum readable document size and a larger document size corresponding to the range of the difference values which the number of white pixels satisfy, or a minimum document size.

12. The image processing apparatus of claim 10, wherein the image processing apparatus is configured so as to be capable of inputting document image data from a document reading apparatus which reads document image data of a document to be conveyed,
when the document image data is inputted from the document reading apparatus, the document size determining section redetermines the document size by estimating a first document size based on a size in a conveyance direction of the document image data which has been read, and, when a plurality of first document sizes are estimated, setting difference values between the respective total numbers of pixels in the plurality of the estimated document sizes to thresholds, comparing the number of white pixels with the thresholds, and thereby determining a second document size.

13. An image forming apparatus comprising the image processing apparatus of claim 10.

14. An image processing method comprising:
a step of inputting document image data corresponding to a document image of a document having been read, extracting candidates for page background pixels from the input document image data and determining a number of page background types;
a step of extracting white pixels from the input document image data; and a step of determining a document size of the input document image data, based on a number of page backgrounds types determined, a page background density value which is the lowest density value in one or a plurality of page background areas determined to be page backgrounds, and a number of white pixels extracted, wherein, when it is determined that a plurality of page background types exists, the page background density value is compared with a predetermined white page background density threshold, and the document size is redetermined when the page background density value is greater than the white page background threshold, wherein the method further comprises a step of determining a document type based on the redetermined document size.

15. An image processing method comprising:

a step of inputting document image data corresponding to a document image of a document having been read, extracting candidates for page background pixels from the input document image data and determining a number of page background types;

a step of extracting white pixels from the input document image data; and a step of determining a document size of the input document image data, based on a number of page backgrounds types determined, a page background density value which is the lowest density value in one or a plurality of page background areas determined to be page backgrounds, and a number of white pixels extracted, wherein, when it is determined that a plurality of page background types exists, the page background density value is compared with a predetermined white page background density threshold, and the document size is redetermined when the page background density value is greater than the white page background threshold, wherein the method further comprises a step of performing the determination whether a document is a color document or a monochrome document based on the redetermined document size.

* * * * *